(12) United States Patent
Wickliffe

(10) Patent No.: US 7,025,698 B2
(45) Date of Patent: Apr. 11, 2006

(54) FRONT DERAILLEUR WITH ANNULAR CHAIN GUIDE, BICYCLE AND METHOD OF OPERATION

(76) Inventor: Christopher Alan Wickliffe, 1320 16th St., Ogden, UT (US) 84404-6008

( * ) Notice: Subject to any disclaimer, the term of this patent is extended or adjusted under 35 U.S.C. 154(b) by 119 days.

(21) Appl. No.: 10/201,849

(22) Filed: Jul. 23, 2002

(65) Prior Publication Data

US 2002/0177498 A1 Nov. 28, 2002

Related U.S. Application Data

(63) Continuation-in-part of application No. 09/488,657, filed on Jan. 20, 2000, now Pat. No. 6,454,671.

(51) Int. Cl.
*F16H 59/00* (2006.01)

(52) U.S. Cl. .......................... 474/80; 474/82

(58) Field of Classification Search ............ 474/78–82, 474/69–70, 140, 144, 116–117, 174–176
See application file for complete search history.

(56) References Cited

U.S. PATENT DOCUMENTS

| | | | |
|---|---|---|---|
| 3,813,955 A | 6/1974 | Huret et al. | |
| 3,890,847 A | 6/1975 | Dian | |
| 4,078,444 A | 3/1978 | Huret | |
| 4,194,409 A | 3/1980 | Nagano | |
| 4,223,562 A * | 9/1980 | Nagano et al. | 474/82 |
| 4,433,963 A | 2/1984 | Shimano | |
| 4,437,848 A | 3/1984 | Shimano | |
| 4,551,121 A * | 11/1985 | Nagano | 474/78 |
| 4,573,950 A * | 3/1986 | Nagano | 474/80 |
| 4,599,079 A | 7/1986 | Chappell | |
| 4,618,332 A | 10/1986 | Nagano | |
| 4,734,083 A | 3/1988 | Nagano | |
| 4,832,667 A | 5/1989 | Wren | |
| 5,312,301 A * | 5/1994 | Kobayashi | 474/82 |
| 5,607,367 A * | 3/1997 | Patterson | 474/80 |
| 5,624,336 A * | 4/1997 | Kojima | 474/82 |
| 5,649,877 A * | 7/1997 | Patterson | 474/80 |
| 5,688,200 A | 11/1997 | White | |
| 5,728,018 A | 3/1998 | Terada et al. | |
| 5,779,581 A | 7/1998 | Fujii | |
| 5,782,714 A | 7/1998 | Osgood | |
| 5,846,148 A | 12/1998 | Fujii | |

(Continued)

FOREIGN PATENT DOCUMENTS

FR 2605969 5/1988

(Continued)

*Primary Examiner*—Marcus Charles
(74) *Attorney, Agent, or Firm*—Morriss O'Bryant Compagni

(57) ABSTRACT

A front derailleur including an annular chain guide for engagement and disengagement of a bicycle chain with multiple chain rings of a crankset. The annular chain guide may be positioned by linear guide rods. The annular chain guide may have an inner lifting surface and an outer pulling surface for engaging diametrically opposed corners of a chain when viewed in cross-section. The annular chain guide may have an opening defined by a polygon having at least five sides. The motion of the annular chain guide during a up-shift, i.e., displacement of the chain from a smaller chain ring to a next larger chain ring includes an upward, outward and rearward linear motion relative to a bicycle frame including upward force exerted by the annular chain guide against the chain. The motion of the annular chain guide during a down-shift is exactly opposite whereby the annular chain guide exerts a pulling down force against the chain.

39 Claims, 21 Drawing Sheets

U.S. PATENT DOCUMENTS 6,471,610 B1 * 10/2002 Tseng et al. .................. 474/80

FOREIGN PATENT DOCUMENTS

| FR | 2621968 | 4/1989 | | |
|----|---------|--------|---|---|
| GB | 470737 | 8/1937 | | |
| IT | 452463 | 10/1949 | | |
| IT | 454769 | 2/1950 | | |
| JP | (05-254481 A | * 10/1993 | .................. | 474/80 |

* cited by examiner

FRONT DERAILLEUR WITH ANNULAR CHAIN GUIDE, BICYCLE AND METHOD OF OPERATION

CROSS-REFERENCE TO RELATED APPLICATION

This is a continuation-in-part application of Ser. No. 09/488,657, filed Jan. 20, 2000, issued as U.S. Pat. No. 6,454,671, Sep. 24, 2002.

FIELD OF THE INVENTION

This invention relates generally to bicycle derailleurs. More specifically, this invention relates to a front derailleur which incorporates an annular chain guide which maintains the lateral position of the bicycle chain, reduces chain wear and drag, and keeps the bicycle chain from derailing off of a plurality of chain rings on a crankset.

BACKGROUND OF THE INVENTION

Most bicycles have multiple gears with front and rear derailleurs to change gears. A front derailleur is used to shift a bicycle chain between two or more chain rings of a crankset. Chain rings vary in diameter, each having a different number of teeth for engagement with the bicycle chain. The force required to turn the crankset is determined, in part, by the size of the particular chain ring the bicycle chain is engaged with. The size of the chain ring can also determine the number of revolutions that will be required of the crankset in order to travel a certain distance. By changing the chain engagement from a chain ring of one size to another, the bicyclist can strategically choose how much force will be required to be applied to the crankset, as well as how many revolutions the crankset will make in order to travel a relative distance.

Conventional bicycle frames are configured with a seat tube joined at one end to a down tube with a bottom bracket lug. The bottom bracket lug supports the "bottom bracket" consisting of the bottom bracket spindle, bearings, races, lock rings, spacers and the like, that are configured to couple with, and allow rotation of, the crankset. The opposite end of the seat tube conventionally supports a seat post and seat for the rider. A front derailleur is typically mounted on the seat tube of a bicycle frame and near the chain rings. Not all bicycle frames have a complete seat tube. For example, some full-suspension mountain bikes have a short seat tube stub for mounting a front derailleur that serves the purpose of a frame structural member for mounting the front derailleur. For simplicity of discussion, it will be assumed that the term "seat tube" denotes a full conventional seat tube or the more recent short seat tube stub for mounting the front derailleur.

A crankset attaches to opposite ends of a bottom bracket spindle. One arm of the crankset is simply a crank arm designed to engage the bottom bracket spindle and a pedal. The other arm of a crankset may include up to 3 chain rings, which require a front derailleur to shift the chain from chain ring to chain ring. The chain rings are typically arranged so as to be concentric with, and parallel to, each other. The smallest chain ring is typically closest to the bicycle frame with the chain rings progressively growing in diameter as they get further from the bike frame. The purpose of a front derailleur is to urge the bicycle chain laterally away from the currently engaged chain ring and towards a chain ring selected by the rider through means of a properly connected shifting device also known as a "shifter." Front derailleurs of various designs have been utilized to perform this function and most have similar features.

Construction and operation of a basic front derailleur is described in U.S. Pat. No. 4,734,083 to Nagano. The Nagano front derailleur includes a member for fixing the front derailleur to the bicycle, a four pin linkage mechanism to effect a pantographic type movement of two guide members, the guide members typically being designated as the inner guide member and the outer guide member. When the assembly is activated to move away from the bicycle frame and toward a larger chain ring, the inner guide pushes the bicycle chain laterally away from the bike frame until the bicycle chain leaves the currently engaged chain ring and engages the next chain ring. The action of urging the bicycle chain onto a larger chain ring often involves the step of pressing the bicycle chain against the side of the larger chain ring. By pressing the bicycle chain against the chain ring, friction combines with the circular motion of the chain ring to "pull" the bicycle chain up and onto the chain ring. When the assembly is activated to move toward the bicycle frame and toward a smaller chain ring, the outer guide urges the bicycle chain in a similar manner, with the outer guide pressing the bicycle chain off of the larger chain ring, and then allowing the bicycle chain to fall onto the smaller chain ring.

The inner and outer guides are spaced at a width which is wider than that of the bicycle chain, often one and a half to two times as wide as the bicycle chain. This allows the bicycle chain to run between the guides without contacting the guides while also allowing for some lateral movement of the bicycle chain which occurs when the bicycle chain is changed from one gear to another by a rear derailleur on a rear sprocket set also referred to as a "cluster" or "cassette". The inner and outer guides each typically comprise a substantially flat elongated surface. The guides are placed substantially parallel to one another and are connected together with a front and rear link. An elongated spatial channel, often referred to as a cage is, thus, defined by the inner and outer guides and the front and rear links. The bicycle chain then passes through the cage without touching the inner and outer guides or the front and rear links during normal operation. There are typically multiple links of chain within the spatial area defined by the cage at any given time.

A typical front derailleur requires periodic adjustment to prevent the bicycle chain from engaging an undesired sprocket, or disengaging all sprockets (also known as derailing). A derailed bicycle chain causes complete loss of power transmission to the driving wheel. Bicycle chain engagement with an undesired chain ring causes the bicyclist to either apply more or less force to the crankset, or perform fewer or greater crankset revolutions than would be desired. Such problems are particularly annoying to the bicyclist when ascending a slope. Because the cage of a derailleur is significantly wider than the width of the bicycle chain, a slight misadjustment of the front derailleur can allow for either of the above situations to arise during normal bicycling activities.

One solution for bicycle chain derailment is found in a mechanism referred to as a chain guide. The general design and function of a chain guide can be seen in U.S. Pat. No. 5,782,714 to Osgood. The Osgood device is a stationary member affixed to the bicycle seat tube to prevent the bicycle chain from disengaging laterally toward the bicycle frame from the chain ring closest to the bicycle frame. The Osgood device thus places a limit on the inward movement of the bicycle chain but does not prevent a derailment of the outermost (largest) chain ring.

Another approach to bicycle chain derailment is a second outer chain guide placed on the outside of the largest chain ring. This outer chain guide is circular, typically a slightly larger diameter than that of the largest chain ring, and is placed concentric with, and adjacent to, the largest chain ring. This outer chain guide places a limit on the outward movement of the bicycle chain. However, an outer chain guide such as this is often cumbersome and unsightly. Neither of these chain guides prevent the bicycle chain from disengaging the selected chain ring to engage with a non-selected chain ring.

Thus, there exists a need in the art for a front derailleur with a chain guide that prevents derailments, both inward and outward, and also prevents the bicycle chain from disengaging a selected chain ring and engaging a non-selected chain ring.

BRIEF SUMMARY OF THE INVENTION

In accordance with one aspect of the present invention, a front derailleur is provided. The front derailleur may include a mounting member configured for attachment to a structural member of a bicycle frame. A positioning assembly may be coupled with the mounting member, where a guide arm of the positioning assembly is configured to move in a linear path. The front derailleur may also include an annular chain guide coupled with and positionable by the guide arm of the positioning assembly, wherein the annular chain guide is configured to receive the bicycle chain therethrough.

In accordance with another aspect of the present invention, another front derailleur is provided. The front derailleur may include a mounting member configured for attachment to a structural member of a bicycle frame. A positioning assembly is coupled with the mounting member and includes a movable guide arm. The front derailleur may also include an annular chain guide coupled with and positionable by the movable guide arm of the positioning assembly. The annular chain guide may also include an opening for receiving a bicycle chain therethrough, wherein a periphery of the opening is defined to include a polygon having at least six sides.

In accordance with another aspect of the invention, yet another front derailleur is provided. The front derailleur may include a mounting member and a positioning assembly coupled with the mounting member and including a movable guide arm. The front derailleur may further include an annular chain guide coupled with and positionable by the movable guide arm, wherein an opening in the annular chain guide is polygonal with at least five sides.

In accordance with another aspect of the present invention, a method for up-shifting a bicycle chain from a first chain ring of a first radius to a second chain ring of a second radius larger than the first radius is disclosed. The method may include aligning an annular chain guide around a bicycle chain on the first chain ring behind the first chain ring and lifting an inside lower corner of the bicycle chain from behind the first chain ring to behind the second chain ring.

In accordance with another aspect of the present invention, a method for down-shifting a bicycle chain from a first chain ring of a first radius to a second chain ring of a second radius smaller than the first radius is disclosed. The method may include aligning an annular chain guide around a bicycle chain on the first chain ring behind the first chain ring and pulling an outside upper corner of the bicycle chain from behind the first chain ring to behind the second chain ring.

In accordance with yet another aspect of the present invention, a bicycle is disclosed. The bicycle may include a bicycle frame having a structural member for mounting bicycle components and a front derailleur. The front derailleur may include a mounting member configured for attachment to the structural member of the bicycle frame. The front derailleur may also include a positioning assembly coupled with the mounting member and including a movable guide arm. The front derailleur may also include an annular chain guide coupled with and positionable by the movable guide arm of the positioning assembly, wherein the annular chain guide includes an opening for receiving a bicycle chain therethrough, and wherein a periphery of the opening is defined to include a polygon having at least five sides.

BRIEF DESCRIPTION OF THE DRAWINGS

The following are brief descriptions of the drawings illustrating embodiments of the present invention. Additionally, like reference numerals refer to like parts in different views of the drawings. It should be noted that the elements shown within the drawings may not be shown to scale.

DETAILED DESCRIPTION OF THE INVENTION

Figure 1:
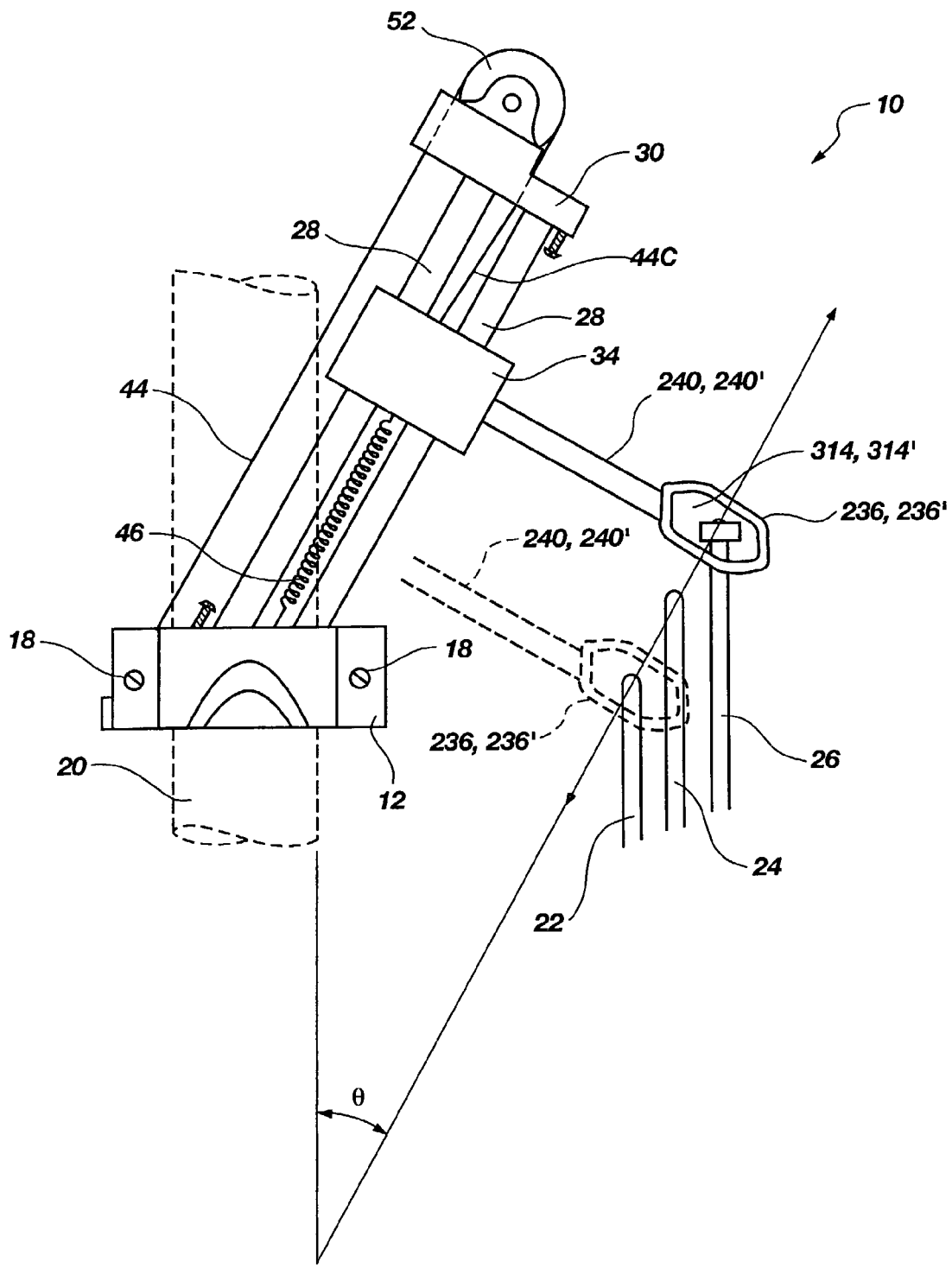
FIG. 1 is a rear view of a front derailleur according to the present invention.
Figure 2:
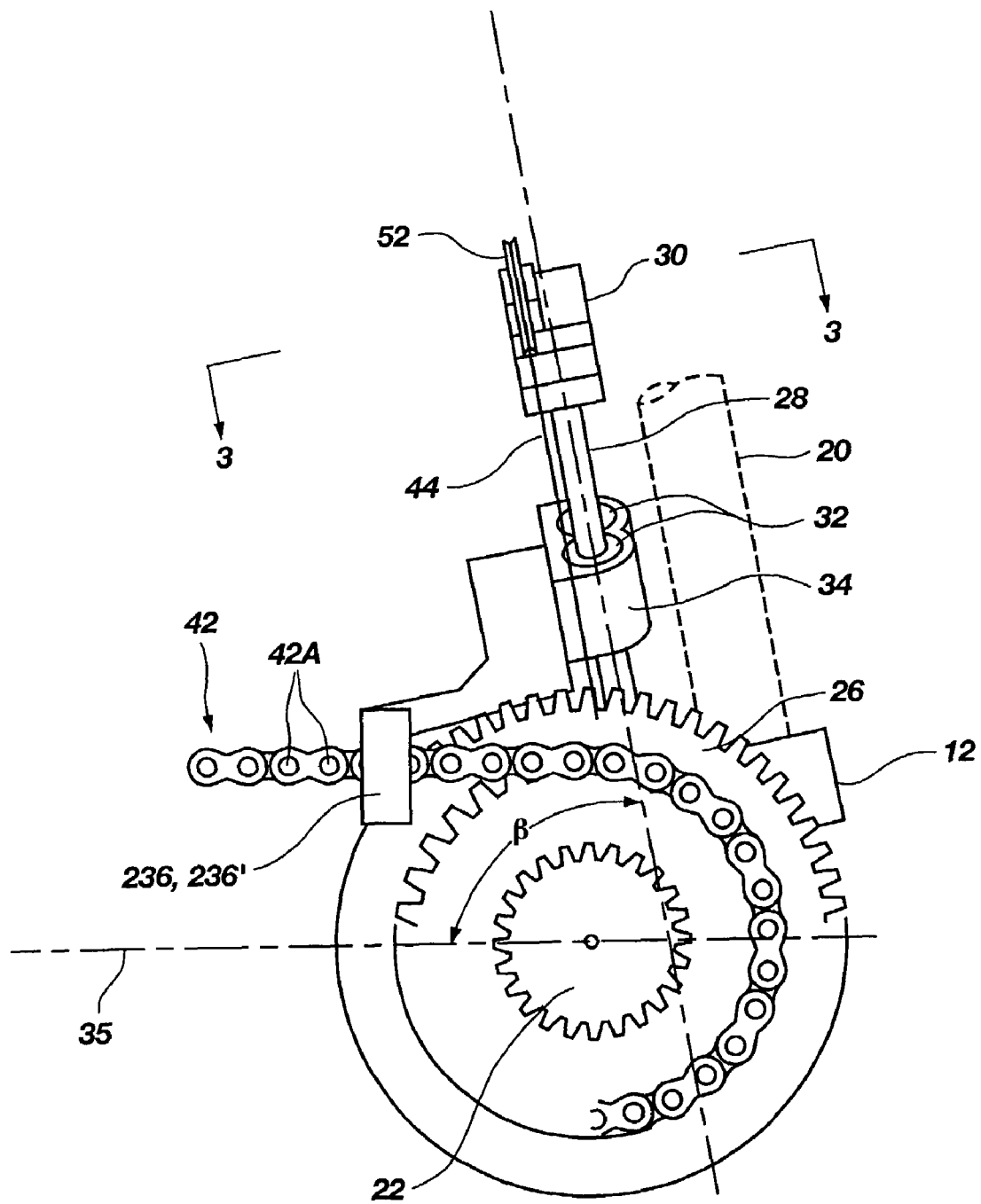
FIG. 2 is a right side view of the embodiment of the invention of FIG. 1.
Figure 3:
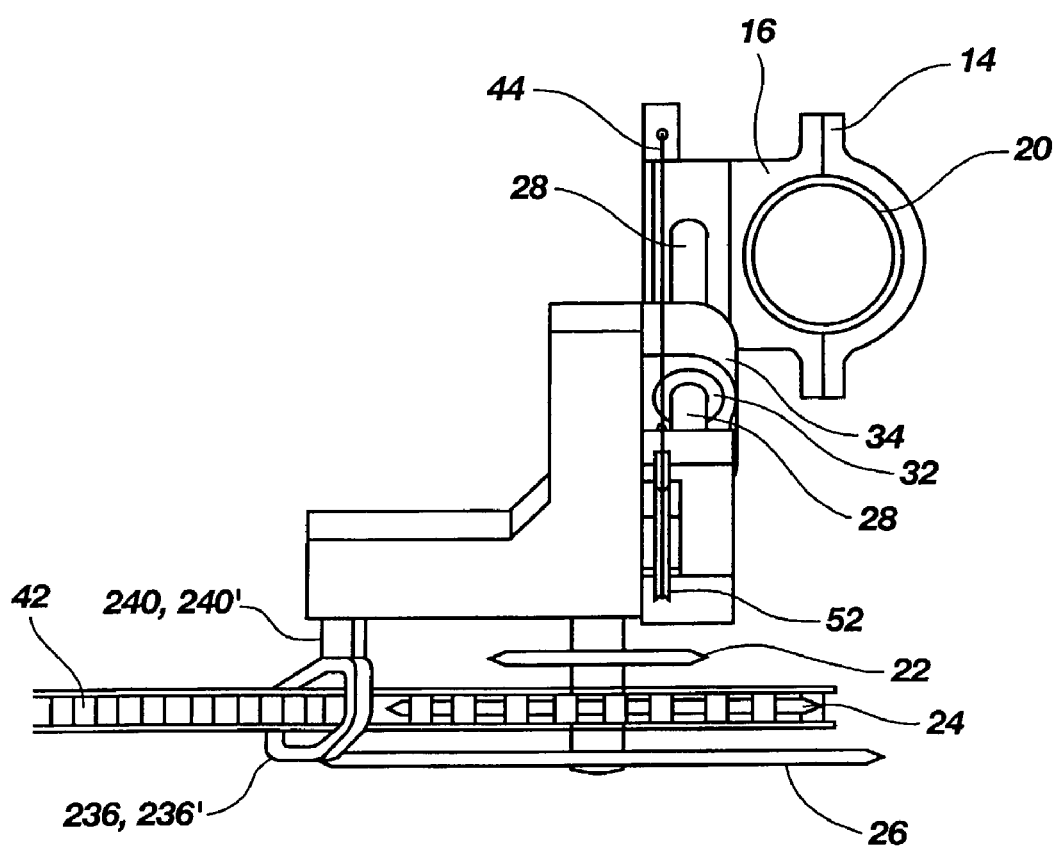
FIG. 3 is a top view of the embodiment of invention of FIGS. 1 and 2, viewed from above and along a direction substantially parallel with the seat tube of a bicycle.

Referring to FIGS. 1–3, a front derailleur 10 is shown. FIG. 1 shows the front derailleur 10 from the rear of a bicycle, i.e., from the rear wheel looking forward. FIG. 2 shows the front derailleur 10 from the right side of the bicycle. FIG. 3 illustrates the front derailleur 10 of FIGS. 1 and 2 from a top view perspective as indicated in FIG. 2. It should be noted that the front derailleur 10 illustrated in FIGS. 1–3 is not necessarily shown to scale.

The front derailleur 10 comprises a mounting member 12 fastened to a bicycle frame member, such as the seat tube 20 (shown in dotted lines), and disposed adjacent to the chain rings 22, 24, and 26 of a bicycle crankset. While three chain rings are shown in FIGS. 1 through 3, it will be apparent to one of ordinary skill in the art that the instant invention may be applied to a bicycle configured with any number of chain rings, e.g., a crankset with only two chain rings.

Figure 10:
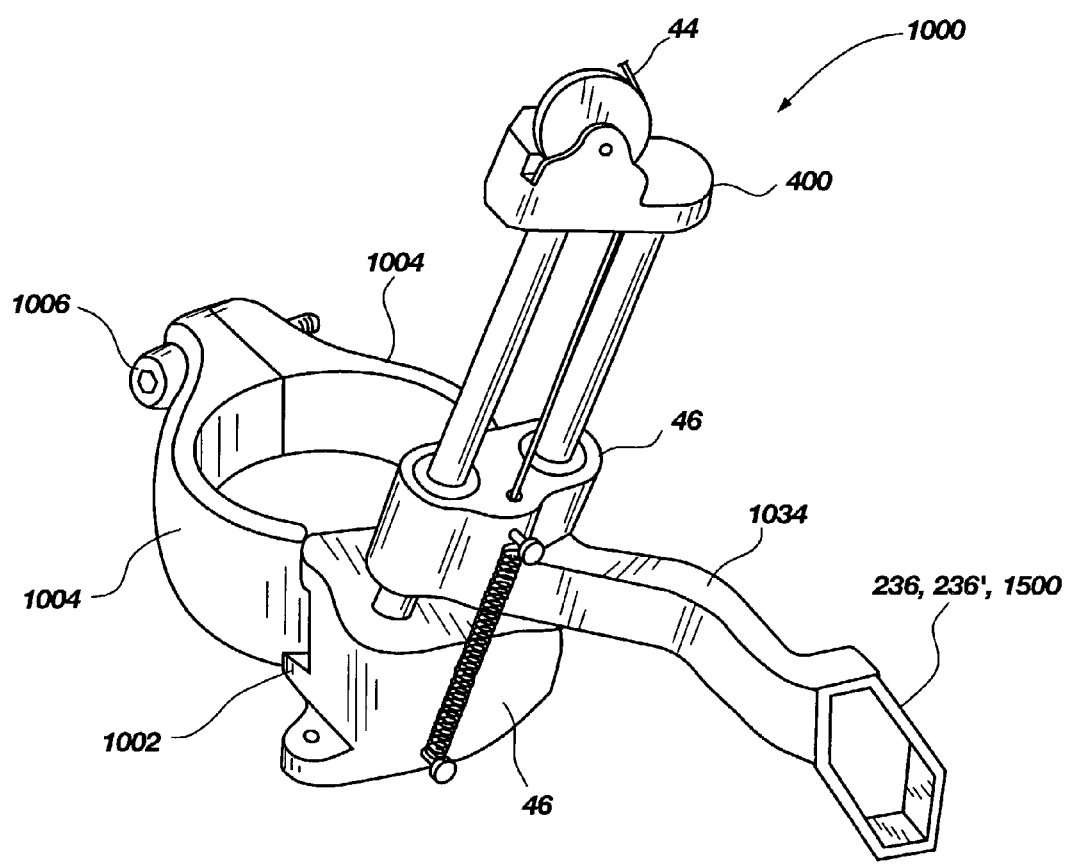
FIG. 10 is a perspective view of a front derailleur including a hinged mounting mechanism in accordance with the present invention.
Figure 11:
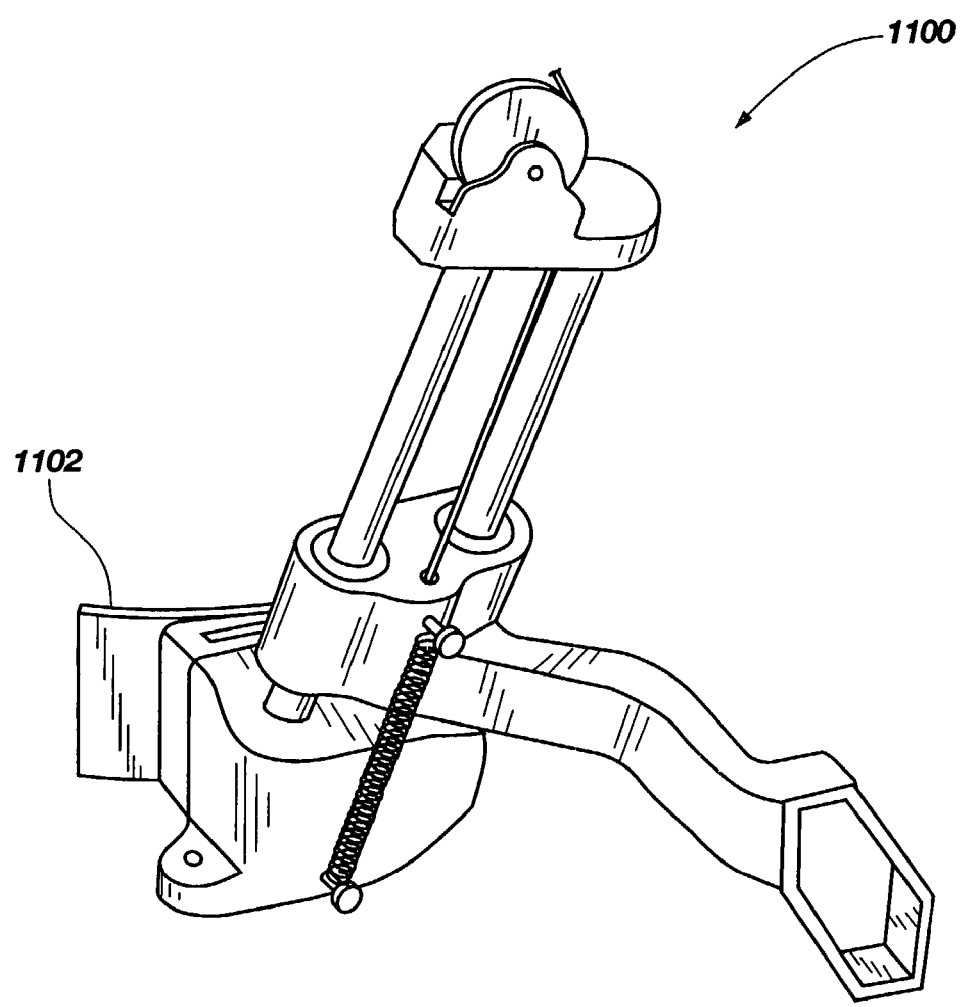
FIG. 11 is a perspective view of a front derailleur including a braze-on mounting mechanism in accordance with the present invention.
Figure 12:
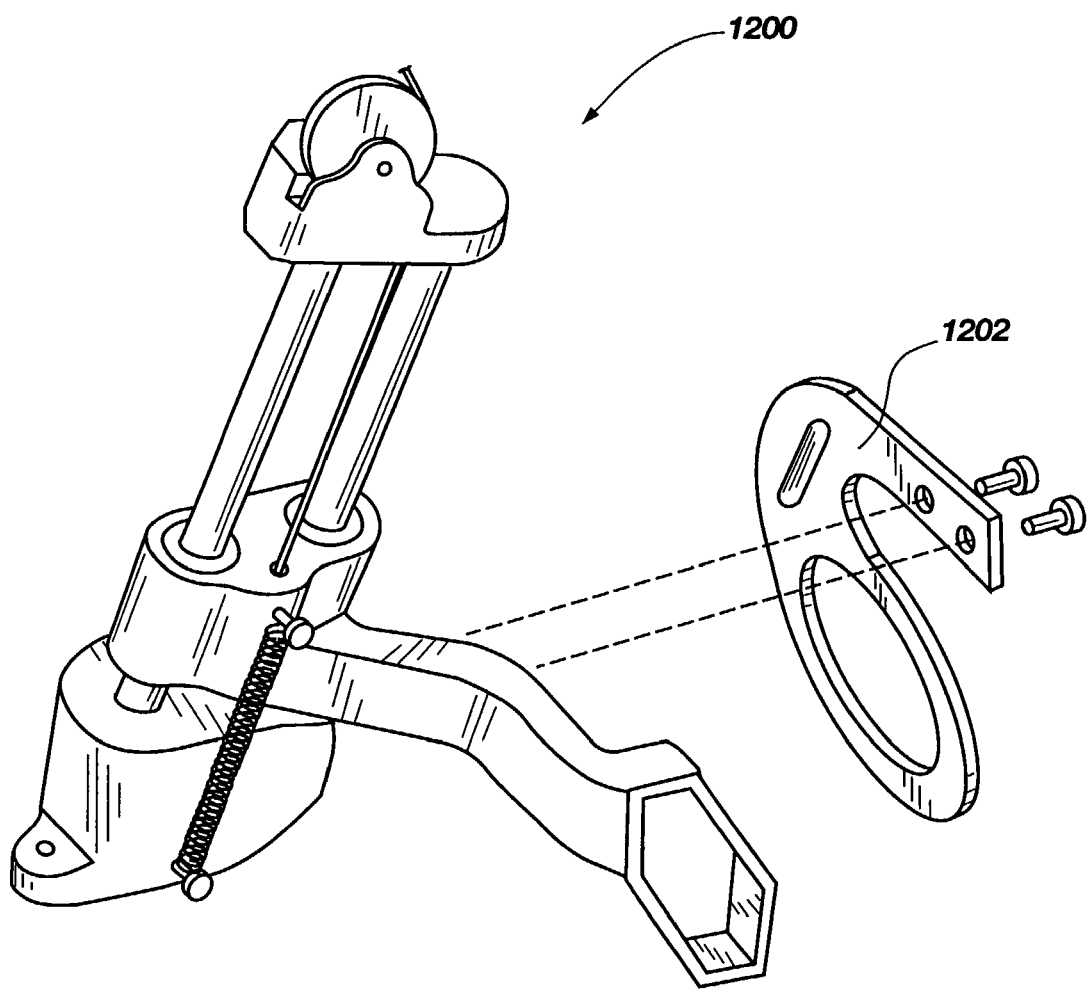
FIG. 12 is a perspective view of a front derailleur including a bottom bracket mounting mechanism in accordance with the present invention.

The mounting member 12 may be a split clamp with suitable diameters allowing for installation on bicycle frames with different sized seat tubes. The mounting member 12 is shown as being a two piece clamping mechanism wherein fasteners 18 provide the clamping action between a front mounting member 14 and a rear mounting member 16. Fasteners 18 may be screws, cam locks, rivets, hinge members or other means for securing members 14 and 16. Mounting member 12 may be a hinged mounting mechanism with a single fastener 18. For example, see hinged mounting mechanism 1002 as shown in FIG. 10 and related discussion, below. It is also contemplated that mounting member 12 may alternatively be a bracket for fastening to a braze-on mount on the seat tube 20 of the bicycle frame. For example, see braze-on mounting mechanism 1102 as shown in FIG. 11 and related discussion, below. Alternatively, mounting member 12 may be a bracket for fastening to another structural member of the bicycle frame, e.g., a bottom bracket. For example, see bottom bracket mounting mechanism 1202 as illustrated in FIG. 12 and related discussion below. All of the above mounting methods are known to one of ordinary skill in the art and thus, are not further described herein.

Referring again to FIG. 1, two linear guide rods 28 are attached to the mounting member 12. The linear guide rods 28 may be cylindrical in shape and may be formed, for example, of a metal such as stainless steel with a polished finish. The linear guide rods 28 are placed next to each other in a parallel orientation. Attached at the top end of the linear guide rods 28 is a structural member 30 for maintaining the parallel relationship of the two linear guide rods 28. A guide arm 34 houses two linear bearings 32 (see FIG. 2) which are slidably disposed on and around the linear guide rods 28. The linear guide rods 28 constrain movement of the guide arm 34 along the length of the linear guide rods 28.

As seen in FIG. 1, an angle θ is defined using the seat tube 20 as a substantially vertical reference line and by drawing a line (or plane into FIG. 1) from the vertical tip (or highest tangent) of the largest chain ring 26 through the vertical tip of the smallest chain ring 22. The linear guide rods 28 are preferably oriented at the angle θ placing the top of the linear guide bearings 32 laterally away from the bicycle frame towards, and adjacent to, the chain rings 22, 24 and 26. In this configuration the linear guide rods 28 will be parallel with a line drawn through the vertical tips of the largest 26 and smallest chain rings 22. It will be appreciated that the specific value of the angle θ depends, at least partially, on the sizes and spacing of the chain rings used, and that the invention is not limited to a particular angular value for θ.

Additionally, as seen in FIG. 2, the linear guide rods 28 may be placed at an angle β with respect to a horizontal axis 35. The angle β may be substantially parallel with the seat tube 20 of the bicycle which, depending on the particular bicycle, is conventionally between approximately 66° and 69° from the horizontal axis 35. Of course, the particular angle of β may vary from such angles and may in part be determined by the various radii of the chain rings 22, 24 and 26. Thus, the angle β need not be parallel with seat tube 20, and may range from 63° and 72° from the horizontal axis 35 in accordance with the present invention.

It is noted that alternative shapes and designs may be utilized for the linear guide rods 28. For example, the linear guide rods 28 need not be cylindrical. However, whatever shape the linear guide rods 28 are chosen to be, the linear bearings 32 must be compatible with, and be slidably disposed on, the linear guide rods 28. Likewise, a different number of linear guide rods 28 may be employed, including the use of only one linear guide rod 28. However, if only one linear guide rod 28 is utilized, other means (such as keying the guide rod 28, with a slot for example, and then matching linear bearing 32 to the guide rod) must be employed to constrain rotational movement of the guide arm 34.

A substantially annular chain guide 236, 236' is attached to the guide arm 34, and positioned so as to receive a bicycle chain 42 therethrough. The annular chain guide 236, 236' may be formed of stainless steel for strength, durability and corrosion resistance. Additionally, various surface hardening treatments may be applied to the annular chain guide 236, 236' and the front derailleur 10 to improve wear and anti-corrosion characteristics. Such surface hardening treatments are known to one of ordinary skill in the art and, thus, will not be further elaborated on herein.

Figure 15:
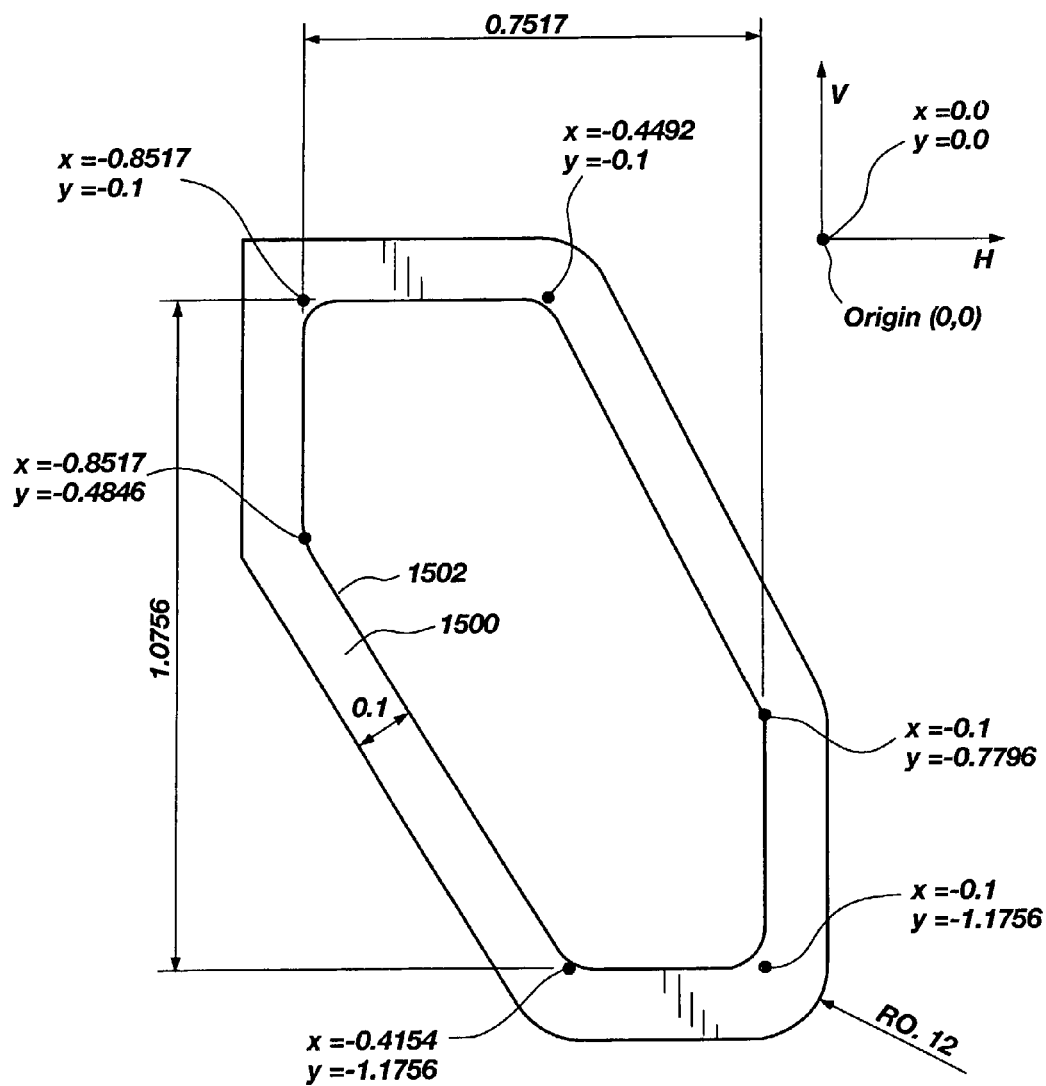
FIG. 15 is a plan view with exemplary dimensions of a presently preferred embodiment of an annular chain guide according to the present invention.

The opening or aperture 114, 314, 314', 1502, in the annular chain guide 236, 236' may be sized slightly larger than the cross-section of the bicycle chain 42. Exemplary dimensions of opening 1502 are shown in FIG. 15. The annular chain guide 236, 236' may be coupled to the guide arm 34 by means of a stem 240, 240'. The stem 240, 240' is fixedly attached to the annular chain guide 236, 236', which may be accomplished by welding, by other bonding methods, by mating threads, or by fasteners. Alternatively, annular chain guide 236, 236' may be integrally formed with the guide arm 34. The term "opening 114, 314, 314', 1502" as used herein refers to an enclosed aperture in the annular chain guide 90, 236, 236', 900, 1500 through which a bicycle chain 42 passes. Openings 114, 314, 314' and 1502 in the annular chain guides 90, 236, 236', 900 and 1500 when viewed in the direction of chain travel as described herein and illustrated in the drawings are all configured as simple convex polygons, i.e., they have no internal angles greater than 180°. For simplicity, the term "polygon" as used herein refers to a "simple convex polygon".

In one embodiment, the stem 240 may be coupled to the guide arm 34 by insertion into a bore (not shown) formed in the guide arm 34. In such a case, the stem 240 may be a pre-selected length which allows for adjustment of the stem 240 axially within the bore. Additionally, the stem 240 may be keyed, for example the stem 240 may be cylindrical with a flat section cut lengthwise on one side of the cylinder. When using such a keyed stem, a set screw (not shown) may be located in the guide arm 34 to press against the flat section of the stem 240 to fix the position of the stem 240, both axially and radially, within the bore.

Other means may be employed for coupling the annular chain guide 236, 236' to the guide arm 34. For example, the annular chain guide 236' and stem 240' may be formed as one element either by machining or casting as depicted in FIGS. 10–12, 13A and 13B. Alternatively, an integrated one piece unit may be employed, wherein the stem 240, 240' is eliminated and the annular chain guide 236, 236' is formed as an integral component of the guide arm 34 as mentioned above. Again, this may be accomplished through either machining or casting of the integrated unit. Arrangements such as these have the benefit of fewer required parts for the assembly of the derailleur 10.

Figure 6A:
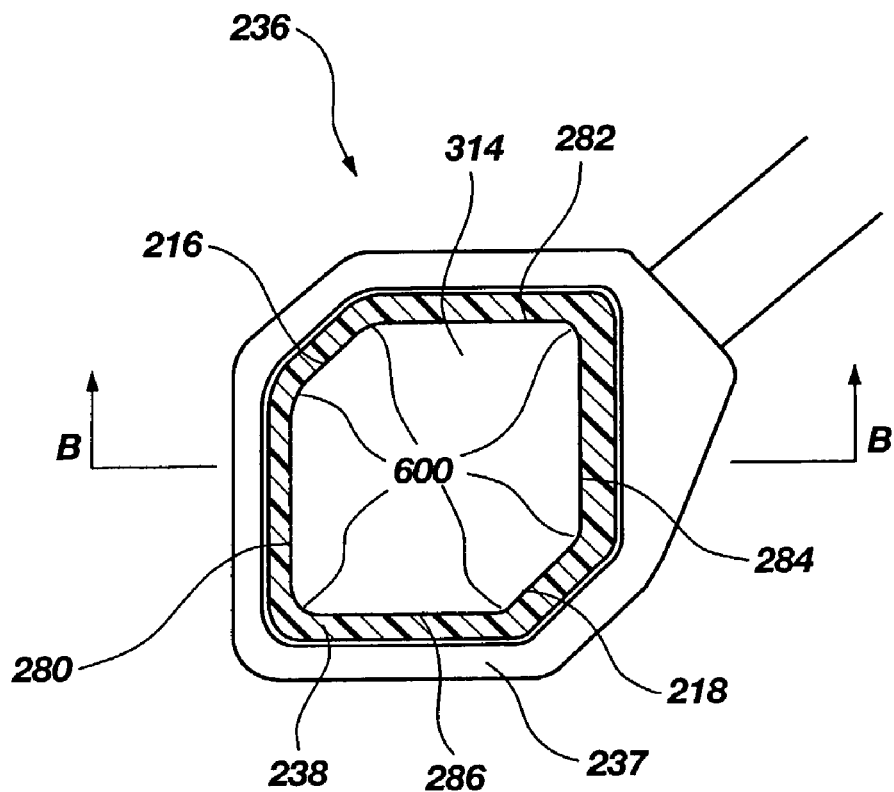
FIGS. 6A and 6B are views of an annular chain guide according to the present invention and suitable for use with the front derailleur shown in FIGS. 1 through 3.
Figure 6B:
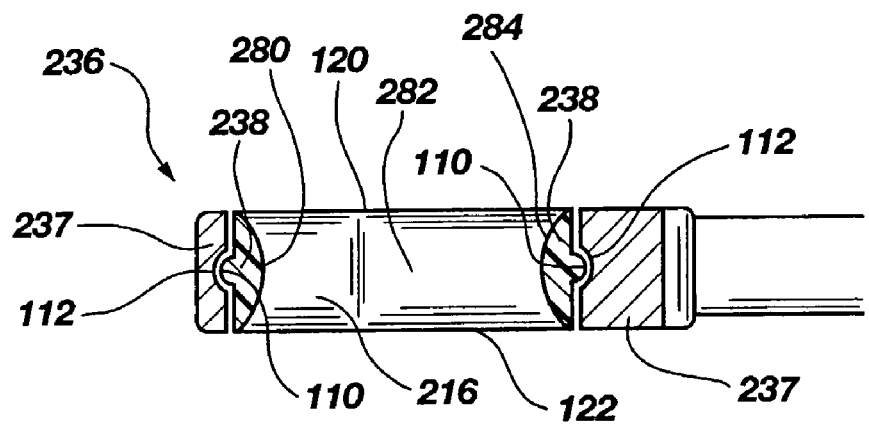

An embodiment of annular chain guide 236 for use with the front derailleur 10 shown in FIGS. 1–3 is depicted in FIGS. 6A and 6B. An annular insert 238 is housed within an outer rim 237. The annular insert 238 may be formed of a relatively hard non-metallic material such as nylon, polytetrafluoroethylene (PTFE), or other Teflon®-like, polymer materials which have desirable wear and low friction properties. By placing an annular insert 238 in this location, the bicycle chain 42 will be in contact with a wear surface which is made of a material softer than that of the bicycle chain 42. This will prevent undue wear on the bicycle chain 42, which wear occurs when any derailleur repeatedly engages a bicycle chain to urge the bicycle chain from one chain ring to another. The opening in the annular insert 238 may be sized slightly larger than the cross-section of the bicycle chain 42.

Referring to FIG. 6A, the annular chain guide 236 is shown as being annular, in the sense that it is a substantially continuous band or ring-like element, but which is substantially rectangular or polygonal rather than circular. The corners, both inside and outside, are preferably rounded. The annular insert 238 is shown as being sized and shaped to match the inside surface of the outer rim 237. As seen in FIG. 6B, the inside surface of the outer rim 237 and the outer perimeter of the annular insert 238 are substantially mating parts. A lip 110 is formed on the outer perimeter of the annular insert 238, and a matching groove 112 is formed along the inside surface of outer rim 237. The annular insert 238 is coupled to the outer rim 237 by positioning the lip 110 of the annular insert 238 into the groove 112 of the outer rim 237. The annular insert 238 may be installed by pressing it into the opening of the outer rim 237 until the lip 110 is securely resting in the groove 112. Alternatively, adhesive may also be used to secure the annular insert 238 within the annular chain guide 236. A small amount of elastic deformation of the annular insert 238 is allowed to accomplish installation of the annular insert 238. Removal of the annular insert 238 is accomplished in a similar manner by pressing the annular insert 238 out of the outer rim 237 with an appropriate amount of force or prying it out with a screwdriver or other appropriate tool. Thus, the annular insert 238 is secured to the outer rim 237 during operation of the bicycle, but may be removed for replacement or for other maintenance requirements as needed.

Referring again to FIG. 6A, the annular insert 238 defines a polygonal opening 314 through which the bicycle chain 42 passes. The opening 314 is defined by an outer wall 280, an inner wall 284, a top wall 282 and a bottom wall 286. Two corner walls 216 and 218 are also formed in the opening 314. The upper-outer corner wall 216 and lower-inner corner wall 218 are oriented at an angle substantially transverse or perpendicular to the line of movement of the annular chain guide 236. The corners 600 of the opening 314 may be radiused. By orienting the opening 314 as described above, the upper-outer corner wall 216 acts to pull the bicycle chain 42 both inward and downward during the operation of the derailleur 10 in urging the bicycle chain 42 toward a smaller chain ring. Likewise, the lower-inner corner wall 218 acts to push the bicycle chain 42 both upward and outward when urging the bicycle chain 42 toward a larger chain ring. Top and bottom walls 282 and 286 and inner and outer walls 284 and 280 are preferably spaced far enough apart to accommodate changes in vertical and lateral position of the chain associated with different rear sprocket positions. Alternatively, opening 314 may be circular, oval, or any other shape which is effective for urging the bicycle chain 42 from one chain ring to another, and which does not catch or bind the chain.

Referring to FIG. 6B, the walls 280, 282, 284, and 286 (not shown because of section view) of the opening 314 are smooth and rounded as they are traversed from the front side 120 to the back side 122. The rounded and smooth configuration of the opening 314, as particularly shown in cross-section of walls 280 and 284, allows the annular insert 238 to interact with the bicycle chain 42 while having a minimum amount of surface contact between the two elements. This configuration prevents the bicycle chain 42 from catching or binding, and reduces wear on the interacting surfaces. While some rounding of the opening 314 is preferred for the reasons stated above, the amount of rounding shown in FIGS. 6B, 7B, 8B, 9B and 13B may be exaggerated for illustration purposes. Additionally, the opening 314, 314' may have little to no rounding and still be within the scope of the present invention.

Figure 13A:
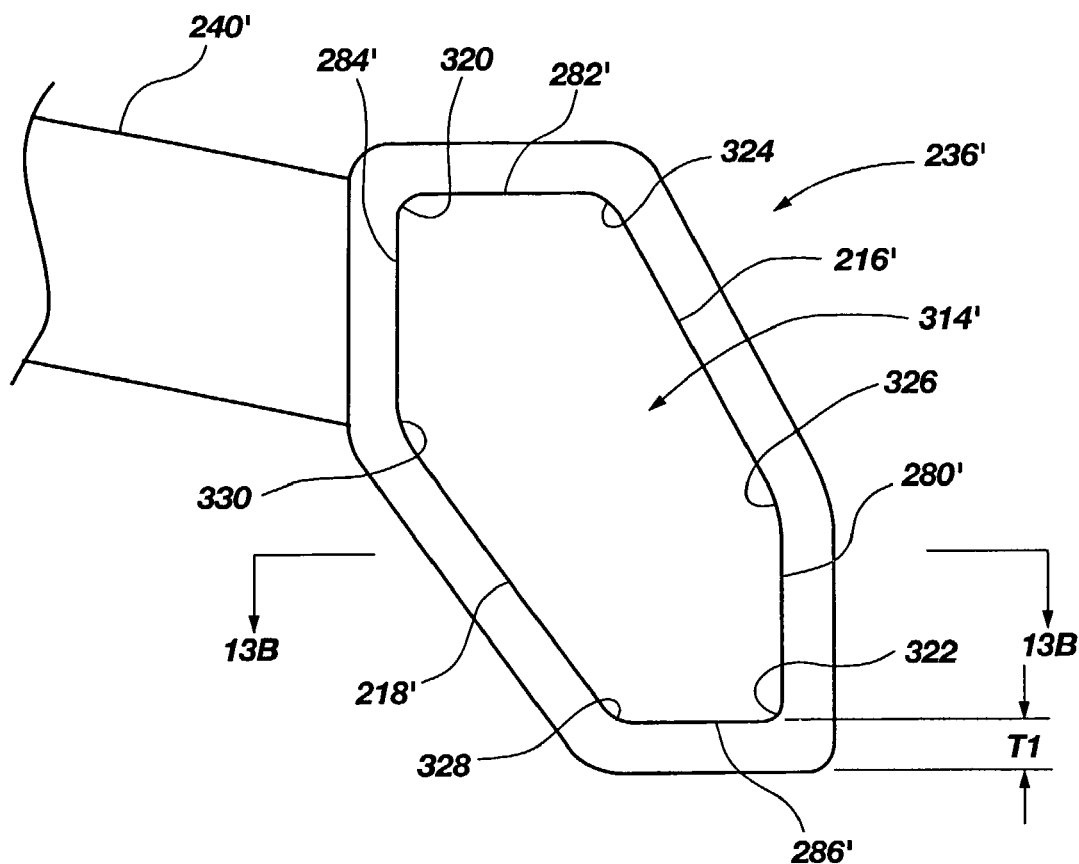
FIGS. 13A and 13B are views of a chain guide according to another embodiment of the present invention.
Figure 13B:
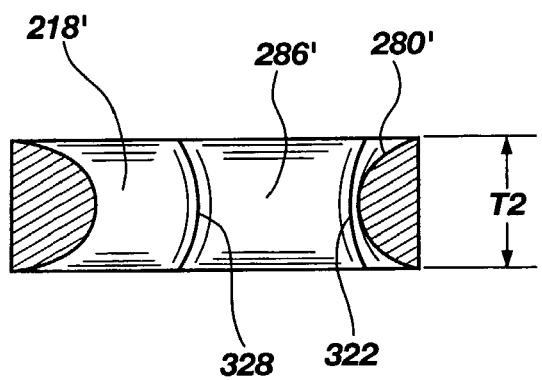

Referring to FIGS. 13A and 13B, another embodiment of the annular chain guide 236' is shown. The annular chain guide includes an opening 314' through which the bicycle chain 42 passes. The opening 314' may be defined generally as a multiple sided polygon. As shown, the opening 314' is a six-sided polygon exhibiting two corners or angles 320 and 322 which are substantially right angles, with the remaining corners or angles 324, 326, 328, and 330 being obtuse angles.

The opening 314' includes an outer wall 280', an inner wall 284', a top wall 282' and a bottom wall 286' and two opposing corner walls 216' and 218'. The upper-outer corner wall 216' and lower-inner corner wall 218' are oriented at an angle substantially transverse or perpendicular to the line of movement of the annular chain guide 236' or, in other words, substantially perpendicular to the angle θ (see, FIG. 1). The corners of the opening 314' are radiused to allow a smooth transition between adjacent walls to prevent catching of the chain thereby. By orienting the opening 314' as described above, the upper-outer corner wall 216' acts to pull the bicycle chain 42 both inward and downward, i.e., along the line defined by angle θ, during the operation of the front derailleur 10 in urging the bicycle chain 42 toward a smaller chain ring. Likewise, the lower-inner corner wall 218' acts to push the bicycle chain 42 both upward and outward (again, along the line defined by angle θ) when urging the bicycle chain 42 toward a larger chain ring. The annular chain guide 236' may be configured such that the corner walls 216' and 218' are the only surfaces intended to make contact with the chain 42 during displacement thereof from one chain ring to another. Corner walls 216' and 218' are not necessarily parallel to one another.

In an embodiment of annular chain guide 236, the upper and lower or walls 282' and 286' and the side walls 280' and 284' may be configured to exhibit an internal length, i.e., along the outline of opening 314', of less than approximately 0.5 inches. Additionally, the corner walls 216' and 218' may be configured to exhibit a length of at least approximately 0.7 inches. The polygon which defines the opening 314' may be configured such that each wall or side of the polygon exhibits a substantially unique length. For example, in one embodiment, the upper wall 282' may exhibit a length of approximately 0.40 inches, the bottom wall 286' approximately 0.32 inches, the inner side wall 284' approximately 0.43 inches, the outer side wall 280' approximately 0.41 inches, the inner corner wall 218' approximately 0.75 inches, and the outer side wall 216' approximately 0.72 inches. The length of the corner walls 216' and 218' may be determined, at least in part, by how many gears are present on the rear sprocket, or the geared drive, coupled with the rear wheel of the bicycle.

The wall thickness T1 of walls 216', 218', 280', 282', 284' and 286' of the annular chain guide 236' may be uniform around its periphery with an exemplary thickness T1 being approximately in the range from about 0.1 to about 0.3 inches. In an alternative embodiment, the thickness T1 may vary from one wall to another for manufacturing considerations, or to accommodate expected wear patterns. The depth or overall thickness T2 of the annular chain guide 236', as shown in FIG. 13B, is desirably a dimension which minimizes contact with the chain 42 while maintaining structural integrity of the annular chain guide 236'. For example, the depth T2 may range from approximately 0.2 to 0.7 inches.

In another embodiment, the opening 314' may include top, bottom and side walls 282', 286', 280' and 284', respectively, which each exhibit a first length, not necessarily identical. In this embodiment, the corner walls 216' and 218' may each exhibit a second length, again not necessarily identical, that is greater than the first length.

Top and bottom walls 282' and 286', respectively, and inner and outer walls 284' and 280', respectively, are preferably spaced far enough apart to accommodate changes in vertical and lateral position of the chain associated with different rear sprocket positions. Alternatively, opening 314, 314' may be circular, oval, or any other shape which is effective for urging the bicycle chain 42 from one chain ring to another, and which does not catch or bind the bicycle chain 42.

FIG. 15 is a plan view with exemplary dimensions of a presently preferred embodiment of an annular chain guide 1500 according to the present invention. FIG. 15 illustrates internal and external dimensions and (x,y) grid coordinates measured in inches of a six-sided annular opening 1502 formed by the annular chain guide 1500. The (x,y) grid coordinates are referenced from origin (0,0) and measured units of inches. FIG. 15 also illustrates and provides exemplary radiusing for inside and outside corners of annular chain guide 1500. The six-sided annular opening 1502 may enclose a maximum area ranging from about 0.3 to about 0.5 square inches, wherein the area lies in a plane perpendicular to the direction of chain travel. In other words, bicycle chain 42 travels perpendicular to the plane enclosing the maximum area, see FIG. 20 where bicycle chain 42 would travel into, or out of, the paper. While annular chain guide 1500 is shown polygonal with 6 sides, other polygonal shapes are contemplated to be within the scope of the invention, including polygons of 5 or more sides with radiused corners. Of course, the dimensions shown are merely exemplary. Other dimensions which vary from those shown are consistent with the present invention and considered within the scope of the present invention.

Referring back to FIG. 1, a cable 44, also known as a "shifter cable," is routed around a pulley 52 and may be attached to the guide arm 34. Alternatively, the cable 44 may be coupled to the pulley 52 and a cable 44 may be attached between the pulley 52 and the guide arm 34 as discussed in more detail below with reference to "bottom pull cable" configurations. The cable 44 is also attached to a shifting device, also known as a "shifter" (not shown) which allows the bicyclist to control the movement of the guide arm 34. A biasing member, shown as a spring 46, has one end attached to the guide arm 34 and the other end attached to the mounting member 12. Thus, the spring 46 acts to bias the guide arm 34 in a downward manner. Other biasing members known to one of ordinary skill in the art may be substituted for the spring 46 in accordance with the present invention.

Still referring to FIG. 1, operation of the front derailleur 10 will now be explained. A bicyclist desiring to engage the bicycle chain 42 with a particular chain ring 26 will activate the shifting device, or "shifter" (not shown) accordingly. In activating the shifting device, the cable 44 is either placed in tension thereby exerting a force on the positioning assembly 34, or relaxed thereby allowing the biasing member 46 to exert a force on the positioning assembly 34. If the cable 44 is in tension, the guide arm 34 is motivated upward, and outward, along the axis of the linear guide rods 28 as defined by angles θ and β. The opening 314, 314' of the annular insert 236, 236' engages the bicycle chain 42 and urges the bicycle chain 42 upward and outward from one chain ring 24 for engagement with the next larger chain ring 26. The bicycle chain 42 is urged with a lifting motion to a position slightly above the chain ring and then allowed to lower slightly so that it engages with the chain ring.

Figure 20:
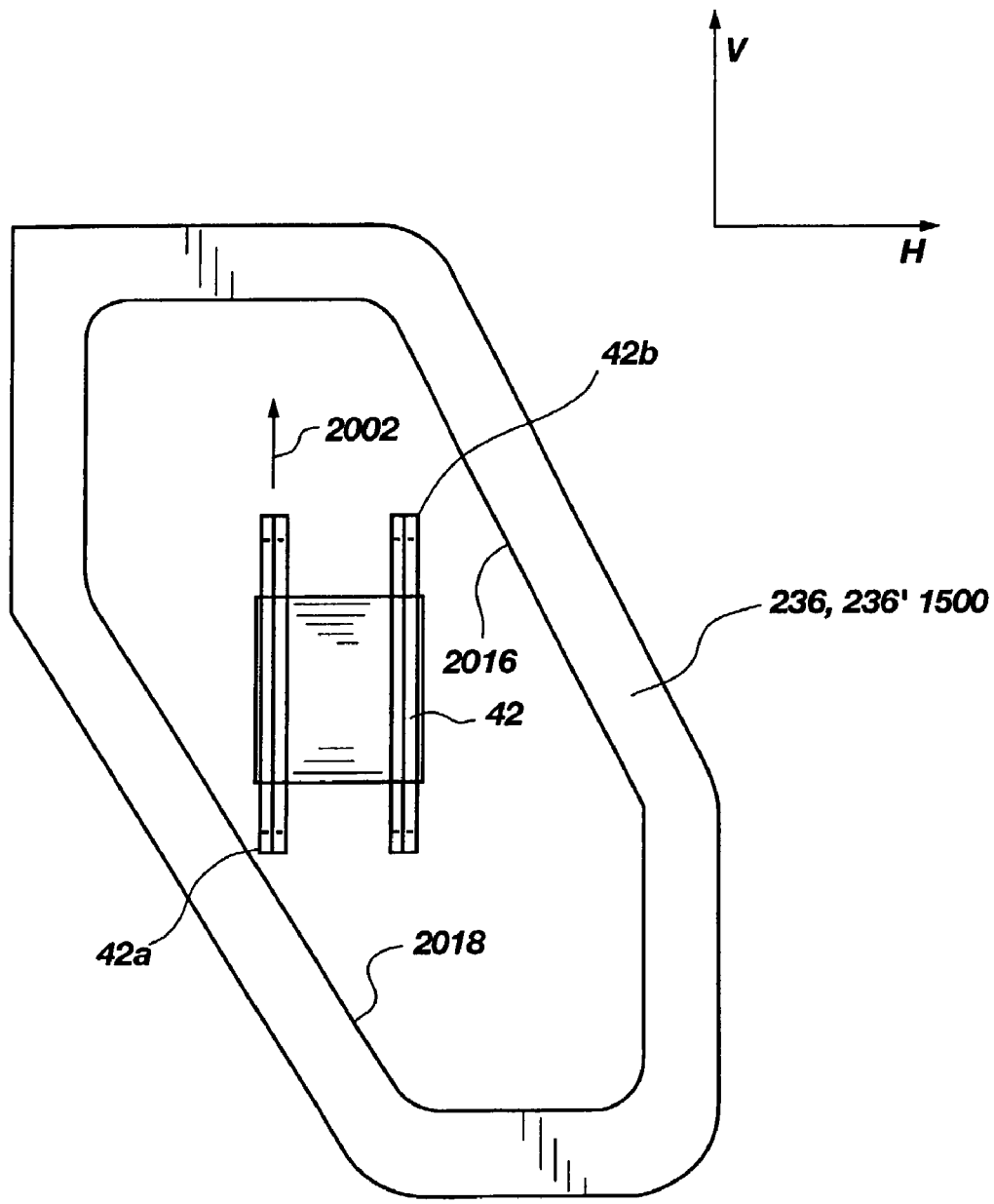
FIG. 20 is cross-section view of a bicycle chain as it engages an annular chain guide of the present invention during an up-shift as viewed from the rear.

The lifting motion of the front derailleur 10 of the present invention during an up-shift contrasts with the lateral grinding motion caused by conventional front derailleurs. In a conventional front derailleur, the side of the derailleur cage pushes laterally against the bicycle chain 42, pushing the chain into the side of the next larger chain ring until a tooth can engage the bicycle chain 42 and pull it up onto the following teeth. In contrast, front derailleur 10 lifts the chain 42 from behind the next larger chain ring and thereby positions the bicycle chain 42 to engage a chain ring tooth and following teeth. Furthermore, the lifting motion is effected by contact with a corner 42a of the bicycle chain 42 as viewed in cross-section, see FIG. 20. As shown in FIG. 20, bicycle chain 42 passes through annular chain guide 236, 236', 1500. During an up-shift, the corner 42a of the bicycle chain is lifted (see arrow 2002). Similarly, during a downshift, a diametrically opposed corner 42b of the bicycle chain 42 is pulled down until the chain 42 engages the next smaller chain ring.

To further elaborate, the opening or aperture of annular chain guide 236, 236', 1500 of front derailleur 10 is configured to lift the inside bottom corner 42a of the bicycle chain 42 during an up-shift. The force exerted against the inside bottom corner 42a of the bicycle chain 42 during an up-shift is upward, outward and toward the rear of the bicycle. In contrast, a conventional front derailleur pushes laterally against the inside of the chain 42 until the outside of the chain 42 comes in contact with the next largest chain ring and the next largest chain ring, not the front derailleur cage, actually lifts the chain 42 up onto its teeth during an up-shift. Thus, a conventional front derailleur exerts essentially no lifting motion against a bicycle chain during an up-shift. Conversely, the opening or aperture of annular chain guide 236, 236', 1500 of front derailleur 10 is configured to pull down on the outside top corner 42b of the bicycle chain 42 during a down-shift. Thus, the force exerted against the outside top corner 42b of the bicycle chain 42 during a down-shift is downward, inward and toward the front of the bicycle. Again in contrast, a conventional front derailleur pushes laterally against the outside of the chain 42 until it comes off of the current chain ring and falls down onto the next smaller chain ring during a down-shift. Thus, a conventional front derailleur exerts essentially no pulling down motion against a bicycle chain 42 during a down-shift.

Figure 21:
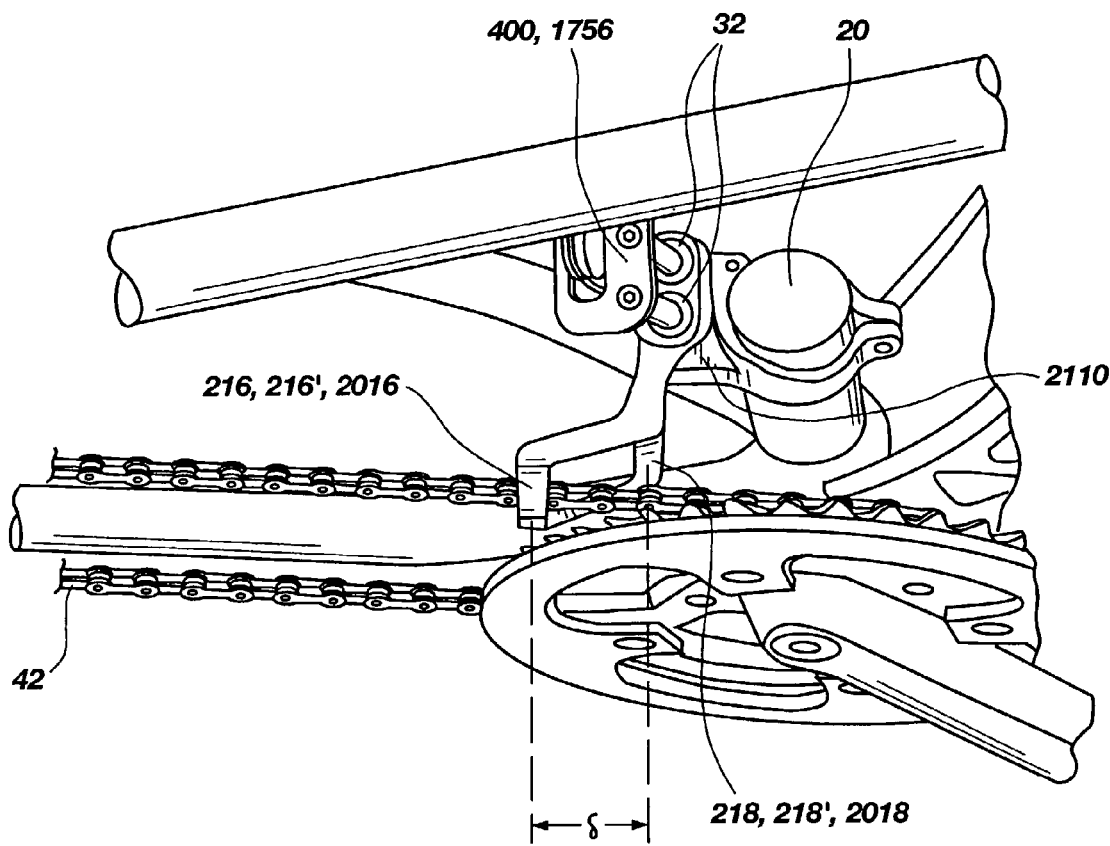
FIG. 21 is a perspective view of yet another front derailleur in accordance with the present invention shown attached to a bicycle frame member.

Walls 218, 218' and 2018, as illustrated in FIGS. 6A–B, 7A–B and 20, may each be referred to as an "inside lifting surface." Similarly, walls 216, 216' and 2016, as illustrated in FIGS. 6A–B, 7A–B and 20, may each be referred to as an "outside pulling surface. The inside lifting surface 218, 218' and 2018 of front derailleur 10 may displaced forward relative to the outside pulling surface 216, 216' and 2016. Conversely, the outside pulling surface 216, 216' and 2016 may be displaced towards the rear of a bicycle relative to the inside lifting surface 218, 218' and 2018. This displacement, δ, may range from about 0 inches to about 1.2 inches or from about 0 to about 2.5 chain links. This displacement, δ, is illustrated in perspective view in FIG. 21. FIG. 21 is a perspective view of front derailleur 2110 in accordance with the present invention. FIG. 21 shows front derailleur 2110 mounted to frame member 20. FIG. 21 also illustrates the outside pulling surface 216, 216' and 2016 may be displaced towards the rear (left in FIG. 21) of a bicycle relative to the inside lifting surface 218, 218' and 2018.

If the cable 44 is relaxed, the spring 46 pulls the guide arm 34 downward, and inward, along the axis of the linear guide rods 28. Again, the opening 314, 314' of the annular chain guide 236, 236' engages the bicycle chain 42, this time motivating the bicycle chain 42 downward and inward from one chain ring 24 to the next smaller chain ring 22. Adjustable stops 48 and 50 are attached to the rear mounting member 16 and the structural member 30, respectively. The adjustable stops 48 and 50 serve to limit the downward and upward travel of the guide arm 34. By properly limiting the motion of the guide arm 34, the bicycle chain 42 will also be limited in its range of movement as defined by the distance between largest and the smallest chain rings 26 and 22, respectively. The small opening 314, 314' in the annular chain guide 236, 236', in combination with the properly defined limits of movement of the guide arm 34, work to prevent improper disengagement or complete derailment of the bicycle chain 42. Once the shift has been completed (the chain has been shifted from one chain ring to another), the annular chain guide 236, 236' is positioned so that bicycle chain 42 is centered within and does not rub against annular chain guide 236, 236'.

A pulley 52 is attached to the structural member 30. The pulley 52 allows for use of a cable 44 that pulls either downward, i.e., a "bottom pull cable 44B", or upward, i.e., a "top pull cable 44B" and is able to translate the force from either an upward (top) or downward (bottom) pull into the desired motion of the positioning assembly 34. Thus, the front derailleur 10 of the present invention is easily adapted to bicycles having either top pull or bottom pull configurations. Pulley 52 may be selectively sized to accommodate a particular make or configuration of shifter, which may be referred to as a "target" shifter.

Figure 14A:
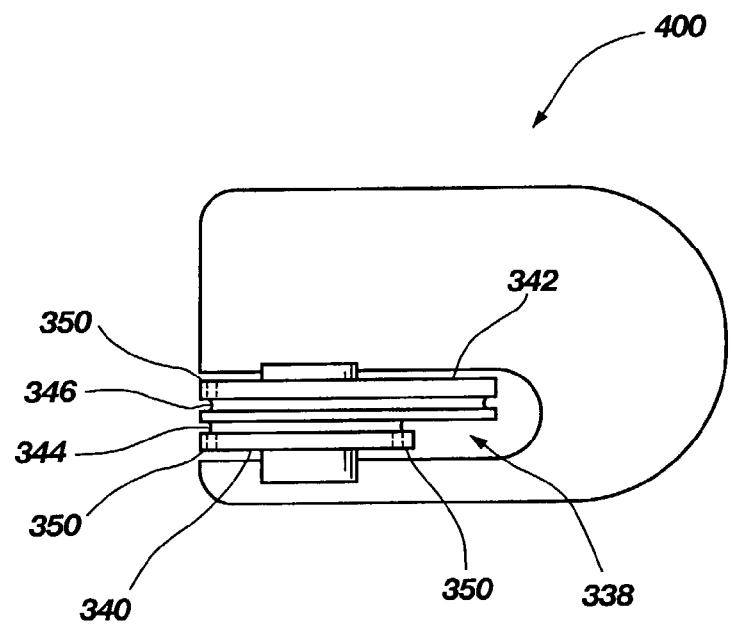
FIGS. 14A and 14B are views of a pulley member used in accordance with certain aspects of the present invention.
Figure 14B:
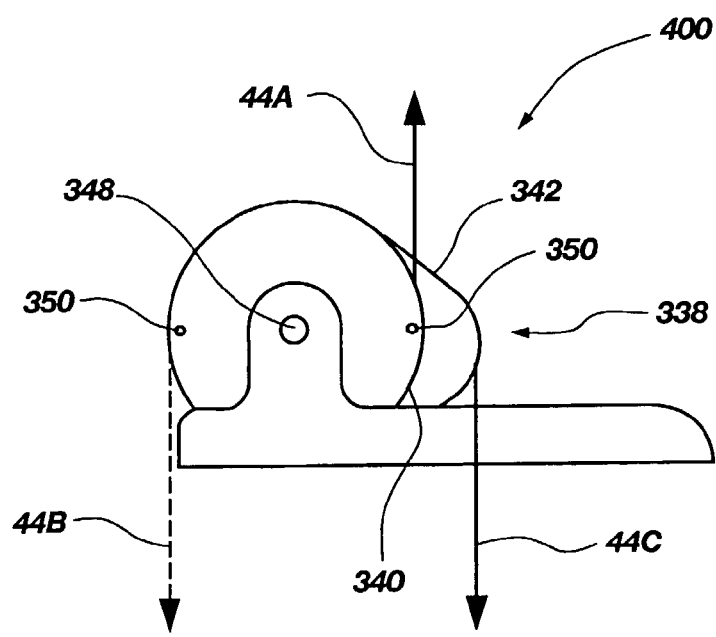

Referring to FIGS. 14A and 14B, a pulley housing 400 is shown. The pulley housing 400 mates with the distal ends (furthest away from mounting member 12) of linear guide rods 28 (not shown in FIGS. 14A and 14B). The pulley housing 400 may include a cam member 338 having a circular portion 340 and a cam portion 342. Alternatively, pulley housing 400 may include a single pulley (not shown) appropriately sized for the target shifter. The circular portion 340 may include a groove 344 formed circumferentially thereabout configured to receive a top pull cable 44A or a bottom pull cable 44B, therein. Integral with the circular portion 340, or alternatively mechanically coupled therewith, is the cam portion 344 which may also include a groove 346 formed circumferentially thereabout to receive the guide arm cable 44C, therein. Guide arm cable 44C may be secured at a first end to cam portion 342 using one or more set screws 350 and at a second end to guide arm 34. Similarly, one or more set screws 350 may be used to anchor a first end of the top pull cable 44A or the bottom pull cable 44B within groove 344 of circular portion 340. The other end of the top pull cable 44A or the bottom pull cable 44B would be secured to the shifter (not shown) through cable guides (not shown) and/or cable housing (not shown) as known to one of ordinary skill in the art.

Compatibility with existing bicycle components may be an important feature for both the manufacturer and the consumer of the inventive front derailleur 10. While it is not necessary for front derailleur 10 to include a pulley housing 400 with a cam member 338, it may be advantageous for applications where different shifters require different shifter cable displacement. By selectively sizing the circular portion 340 and the cam portion 342 virtually any make of shifters may be accommodated with a single front derailleur 10 including a cam member 338. Cam member 338 may be serviceable and replaceable. Cam member 338 may also be optimally sized for a particular make of shifter. Various cam shapes may be used to accommodate the necessary displacement of guide arm 34 in accordance with the present invention.

The interchangeability of the cam member 338 enables front derailleur 10 to be used with various shifters. Because different shifters are calibrated to displace the top pull cable 44A (or bottom pull cable 44B) at differing magnitudes, it is desirable to provide a simple means of calibrating the front derailleur 10 to the specific shifter being used. Thus, by configuring the particular shape of the cam portion 342 and the diameter of the circular portion 340 the movement of the positioning assembly 34 (FIG. 1) may be calibrated with a specific shifter. By determining the type of shifter being used and its displacement of the top pull cable 44A (or bottom pull cable 44B), a properly configured cam member 338 may be selected and installed into the front derailleur 10. While other methods of calibration may be used, the use of such a cam member 338 allows for a simple and inexpensive technique which does not require disassembly and alteration of the actual shifter with which the derailleur is coupled.

Front derailleur 10 may be packaged with multiple cam members 338 each sized for a particular brand of shifter. Alternatively, cam member 338 may be packaged and sold separately as an optional or replacement component of front derailleur 10. The sizing and selection of the shape of cam member 338 is within the ability of one of ordinary skill in the art and, thus, will not be further elaborated herein.

In the above-described configuration of pulley housing 400, two cables are required to operate front derailleur 10: (1) a guide arm cable 44C and (2) a top pull cable 44A or bottom pull cable 44B. Yet another embodiment of a pulley housing 400 (not shown) may include a single pulley and groove for receiving a single cable 44. This embodiment of a pulley housing 400 (not shown) would include securing one end of cable 44 at the shifter, routing cable 44 through cable guides (not shown) and/or cable housing (not shown) and securing the other end of cable 44 at guide arm 34. This embodiment of a pulley housing 400 (not shown) may be configured as necessary to accommodate a top or bottom pull cable configuration as known to one of ordinary skill in the art. Advantages of this configuration of pulley housing 400 (not shown) may include weight savings and simplicity of using a single cable 44.

Upon actuation of either the top pull cable 44A or the bottom pull cable 44B, both the circular portion 340 and the cam portion are caused to rotate about their common axis 348. However, the rotation of the cam portion 342 causes an amplified displacement of guide arm cable 44C relative to that of the top pull cable 44A or bottom pull cable 44B. Thus, a relatively small movement of the top pull cable 44A or bottom pull cable 44B may result in a relatively large movement of the bottom pull cable 44B and the positioning assembly 34 to which it is attached (FIG. 1). Of course, one of ordinary skill in the art could devise other pulley-based mechanisms consistent with the present invention to effectuate the desired movement of guide arm 34. Such other mechanisms are considered within the scope of the present invention.

Figure 7A:
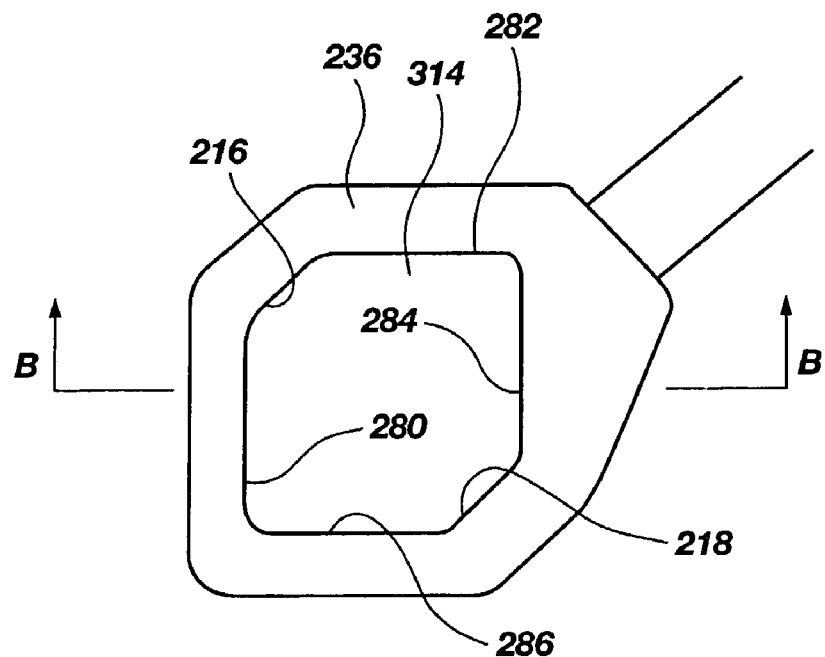
FIGS. 7A and 7B are views of an alternative embodiment of an annular chain guide according to the present invention and suitable for use with the front derailleur shown in FIGS. 1 through 3.
Figure 7B:
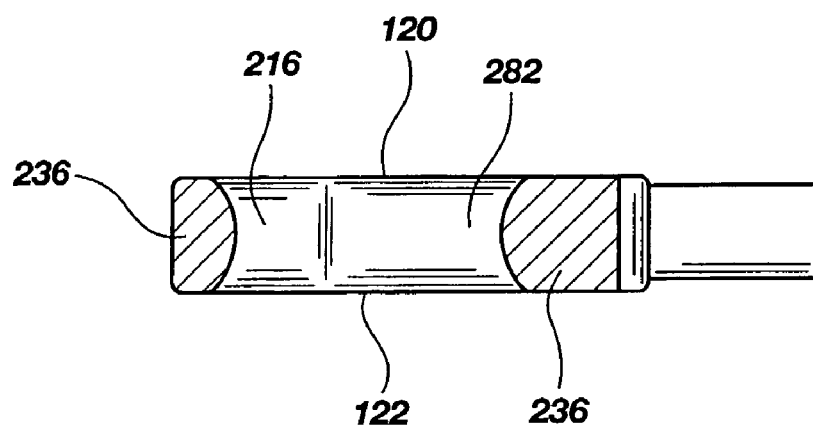

It is noted that various modifications may be made to the present invention without departing from the spirit or scope of the invention. For example, alternative mechanisms could be utilized to induce the motion of the guide arm 34. In another embodiment, hydraulics may be employed to control the motion of the guide arm 34 in place of the cable 44. Yet another embodiment includes an annular chain guide 236, 236' constructed of a single material, without an annular insert 238, as shown in FIGS. 7A and 7B. The shape and functioning of the chain guide 236, 236' is the same as the chain guide depicted in FIGS. 6A and 6B; however, because the surface of the guide contacting the chain is a harder material, e.g., metal, the wear to the chain will be increased, while the wear to the chain guide may be reduced. Yet another embodiment may include a second mounting member coupled between structural member 30 and the seat tube or other bicycle frame member to stabilize the one or more linear guide rods 28 when the bicycle chain 42 is being shifted. Furthermore, various combinations of alternative elements as discussed are within the scope and spirit of the present invention.

Figure 4:
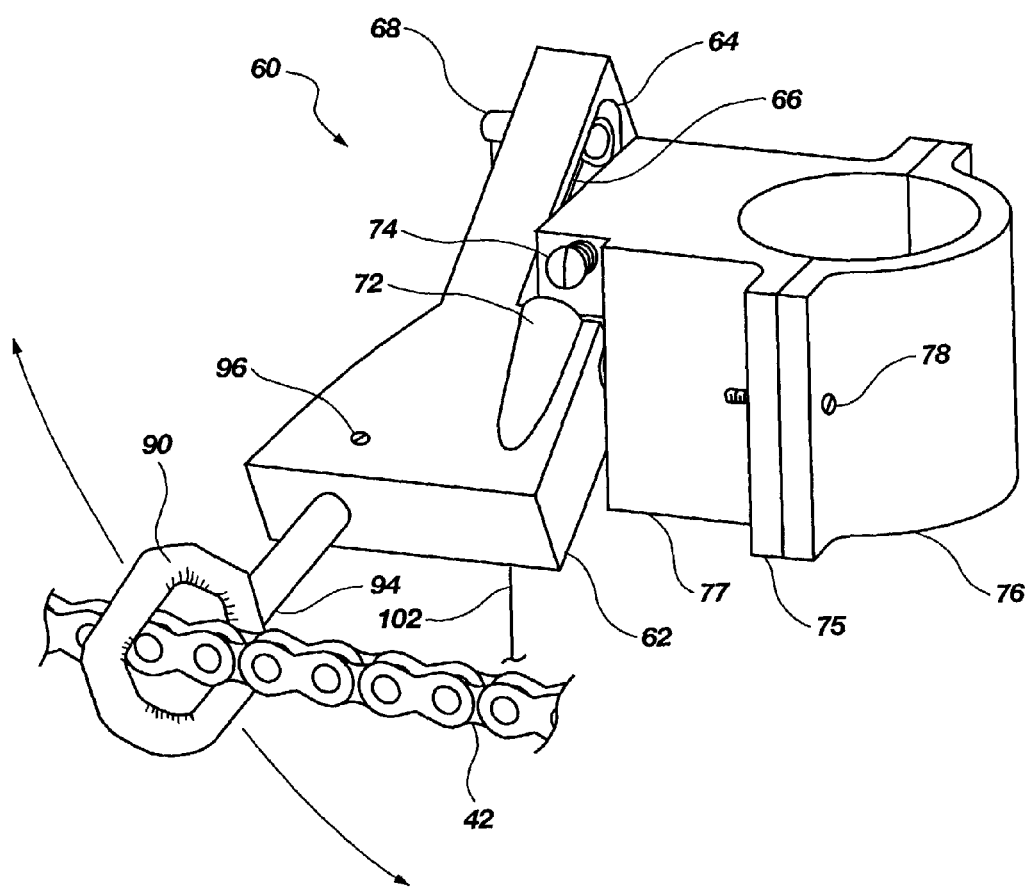
FIG. 4 is a perspective view of an alternative embodiment of the present invention.
Figure 5:
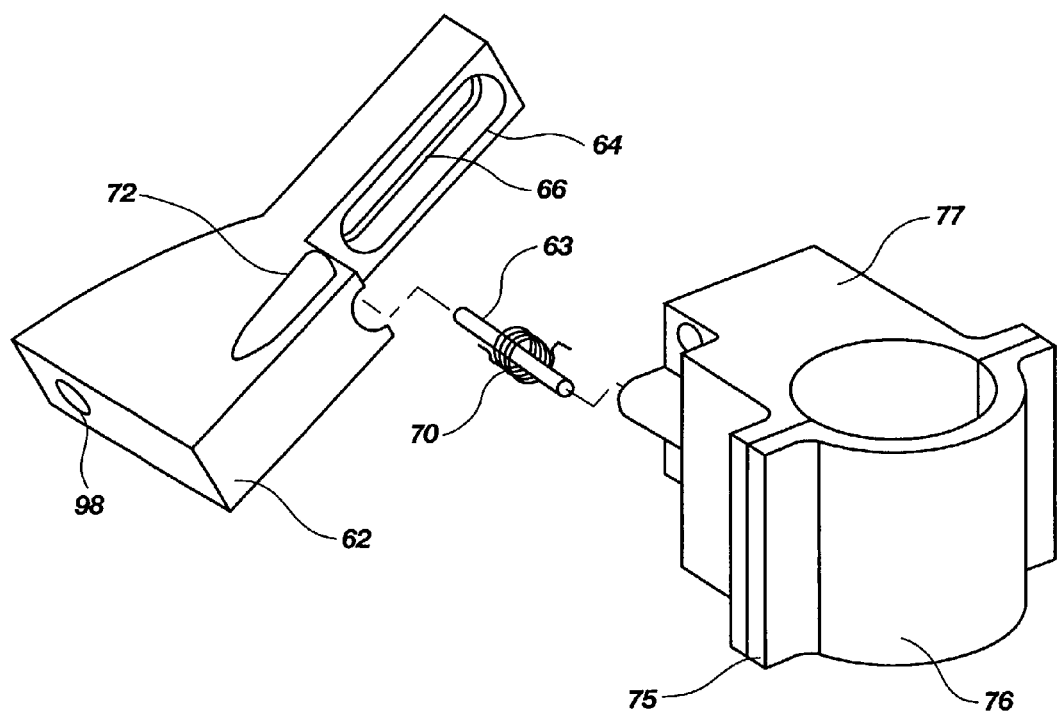
FIG. 5 is an exploded view of elements of the embodiment of FIG. 4.

Referring now to FIGS. 4 and 5, another embodiment of a front derailleur 60 according to this invention is disclosed. A mounting member 75 is fastened to a bicycle frame member such as a seat tube (not shown). The mounting member 75 is a split clamp which allows for installation on numerous bicycle frames. The mounting member 75 is shown as being a two piece clamping mechanism wherein fasteners 78 provide the clamping action between a front mounting member 76 and a rear mounting member 77. Front and rear mounting members 76 and 77 may also be hinged together to form a mounting member 75 with a hinged clamping mechanism, see FIG. 10 and related discussion below. Fasteners 78 may be screws, cam locks, rivets or other means for securing members 76 and 77. It is contemplated that mounting member 75 may alternatively be a bracket for fastening to a braze-on mount on a seat tube of the bicycle frame, or a bracket for fastening to another member of the bicycle frame, see FIG. 11 and related discussion below.

A pivot arm 62 may be pivotally connected to the rear bracket member 77 by means of a bearing pin 63 or other suitable means. A coil spring 70 is housed between the rear mounting member 77 and the pivot arm 62 concentric with the bearing pin 63 to provide a torsional bias to pivot arm 62. An annular chain guide 90 is connected to a stem 94 which is inserted into a bore 98 in the pivot arm 62. The stem 94 is keyed to the bore and is axially adjustable within the bore. A set screw 96 secures the position of the stem 94. Two embodiments of the annular chain guide 90, 900 are shown in detail in FIGS. 8A, 8B, 9A and 9B. A bicycle chain 42 is received through the opening 114 of the annular insert 92, or alternatively through the opening 114 of the annular chain guide 900 if an annular insert 92 is not being utilized.

Referring again to FIGS. 4 and 5, a slot 64 is provided in the back side of the pivot arm 62. The slot 64 has a shouldered surface 66 allowing the head of a fastener 68 to be seated thereon. The fastener 68 allows for attachment of a cable 102. A stop 72 is shown on the top side of the pivot arm. The stop 72 interacts with an adjustment screw 74, which is threaded in the rear mounting member 77. The stop 72 and the adjustment screw 74 work together to define a rotational limit of the pivot arm 62. A similar stop and adjustment screw (not shown) are found on the bottom side of the derailleur 60 to limit rotational movement of the pivot arm 62 in the opposite direction.

The front derailleur 60 is operated by a bicyclist activating a shifting mechanism, or shifter, (not shown) which in turn causes the cable 102 to either pull down on the back portion of the pivot arm 62, or to relax the tension on the cable 102. When the cable 102 is relaxed, the coil spring 70 acts torsionally to rotate the front portion of the pivot arm downward until the pivot arm 62 has reached its limit of rotation. Thus, the movement of the pivot arm 62 controls the position of the annular chain guide 90. The annular chain guide 90 travels in an arcuate path urging the bicycle chain 42 upward and outward, to the next largest chain ring (not shown in FIG. 4 or FIG. 5), or downward and inward to the next smallest chain ring.

Figure 8A:
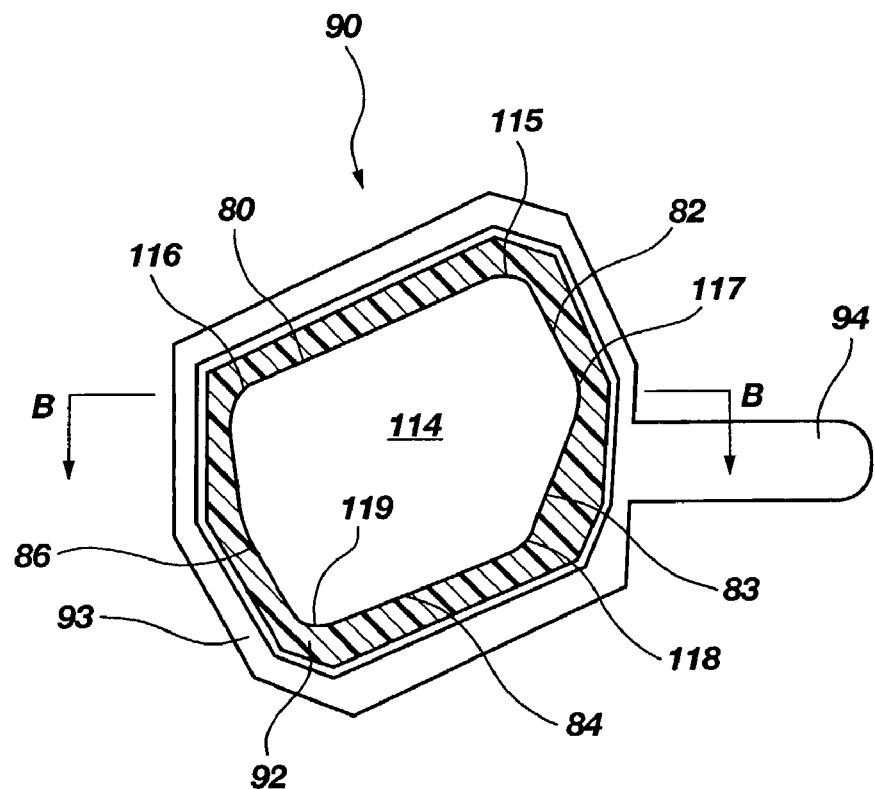
FIGS. 8A and 8B are views of an annular chain guide according to the present invention and suitable for use in the front derailleur shown in FIGS. 4 and 5.
Figure 8B:
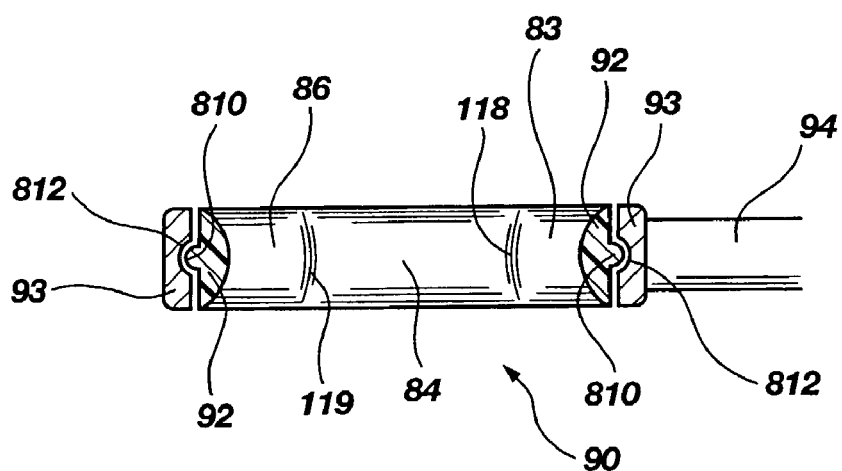

FIGS. 8A and 8B depict another embodiment of a chain guide 90 configured for use with the front derailleur 60 shown in FIGS. 4 and 5. Chain guide 90 differs from the chain guide 236, 236' used with the embodiment of the invention in FIGS. 1 through 3 in that the shape of opening 114 has been modified so that the side of the opening 114 contacting the chain is oriented appropriately throughout the movement of the chain guide. In general, the chain is urged downward and inward by upper wall 80 of opening 114 and upward and outward by lower wall 84 and lower-inner wall 83 of opening 114. It will be appreciated that, because the chain guide moves in an arc rather than in a linear pattern, the side of the opening 114 contacting the chain varies as the chain guide is moved. Thus, when the chain guide is near the bottom of its arc (near the smallest chain ring) the chain will be urged upward by lower wall 84, and will contact lower wall 84 in the region closer to corner 119.

Figure 9A:
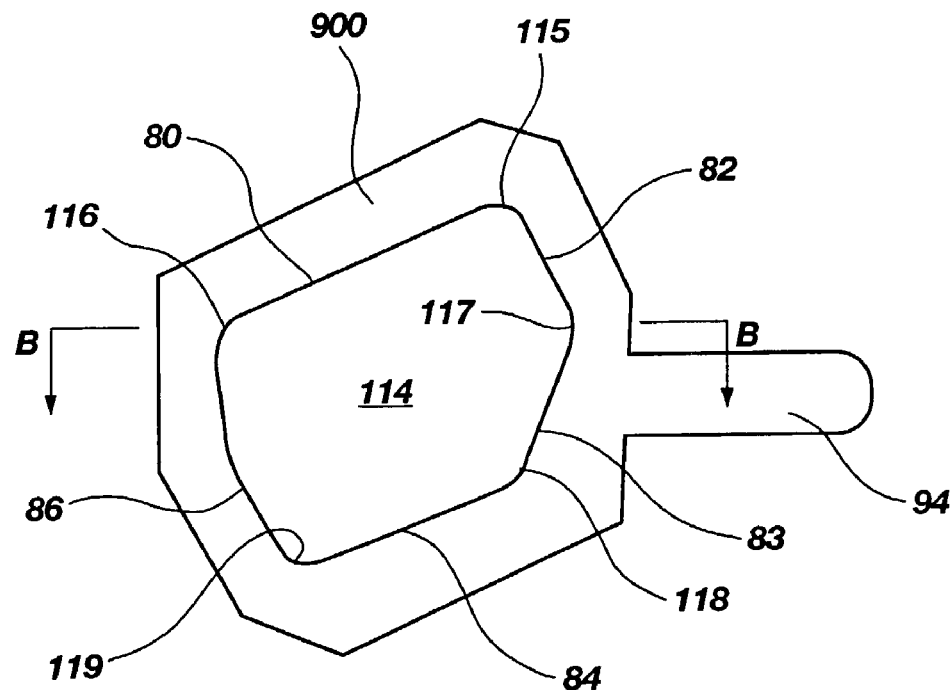
FIGS. 9A and 9B are views of an alternative embodiment of an annular chain guide according to the present invention and suitable for use in the front derailleur shown in FIGS. 4 and 5.
Figure 9B:
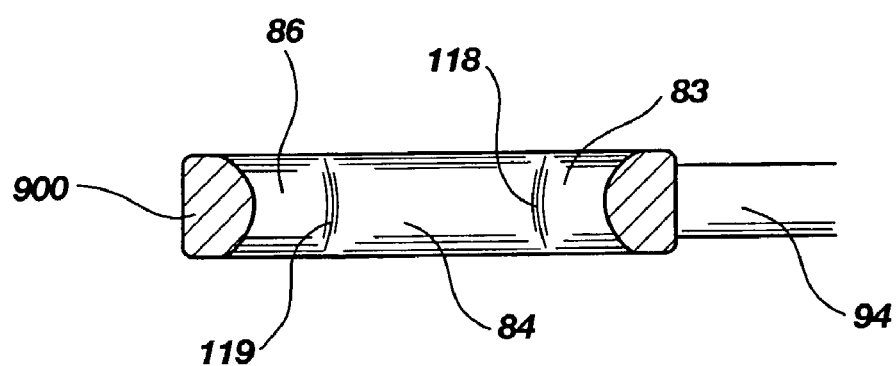

As the chain guide is moved upward and outward, in the arcuate path indicated in FIG. 4, the chain will move along lower wall 84 until it reaches corner 118, and then move onto lower-inner wall 83, until at the top of its arc, it will contact lower-inner wall 83 closer to corner 117. When the chain is to be moved downward, at the highest part of the arc chain 42 will contact upper wall 80 closer to corner 116. As the chain guide is moved downward and inward, the chain will move toward corner 115 along upper wall 80. The embodiment of the chain guide 90 shown in FIGS. 8A and 8B may include an annular insert 92 which is secured to outer rim 93 by means of a lip 810 on insert 92 which fits into groove 812 formed in outer rim 93. The chain guide 900 shown in FIGS. 9A and 9B is similar in shape to the chain guide 90 of FIGS. 8A and 8B, but is constructed of a single material and does not include an annular insert 92.

Again, modifications to the disclosed embodiment are contemplated as being within the scope and spirit of the invention. For example, various shapes and configurations of the annular chain guide 90 and annular insert 92 may be employed in the instant embodiment. Likewise, alternative embodiments are contemplated wherein the stem 94 is coupled to the swing arm 62 in a different manner, such as by welding or another type of bonding. The stem 94 could also be eliminated altogether to create an integral unit of the annular chain guide 90 and the swing arm 62. Furthermore, the components of the derailleur 60 as just described may be made from various materials such as stainless steel, aluminum, titanium, or composite materials depending on the desired corrosion and wear resistance, as well as the desired strength to weight ratio.

In yet another embodiment, a positioning assembly may comprise a four pin linkage mechanism as described in U.S. Pat. No. 4,743,083 to Nagano, the disclosure of which is herein incorporated by reference for all purposes. In this embodiment the annular chain guide 236, 236', 90, 900 is coupled to, and positioned by, a four pin linkage mechanism.

FIG. 10 is a perspective view of a front derailleur 1000 in accordance with the present invention including a hinged mounting mechanism 1002. Hinged mounting mechanism may included hinged clamps 1004 secured by a screw 1006. Front derailleur 1000 may include guide arm 1034 with integrated annular chain guide 236, 236' and biased by spring 46. Front derailleur 1000 may also include a pulley housing 400 coupled to guide arm 1034 by a guide arm cable 44C for positioning the guide arm 1034 over linear guide rods 28 in response to a cable 44. Cable 44 may be a top pull cable 44A or bottom pull cable as described above.

FIG. 11 is a perspective view of a front derailleur 1100 in accordance with the present invention. Front derailleur 1100 is similar to front derailleur 1000 except for the braze-on mounting mechanism 1102. Braze-on mounting mechanism 1102 may include a bracket for mechanically coupling to a braze-on that is permanently affixed to the seat tube or its equivalent bicycle frame structural member.

FIG. 12 is a perspective view of a front derailleur 1200 in accordance with the present invention. Front derailleur 1200 is similar to front derailleur 1000 except for the bottom bracket mounting mechanism 1202. Bottom bracket mounting mechanism 1202 may be configured for attaching front derailleur 1200 to a bottom bracket (not shown) with lock rings or the like.

Figure 16A:
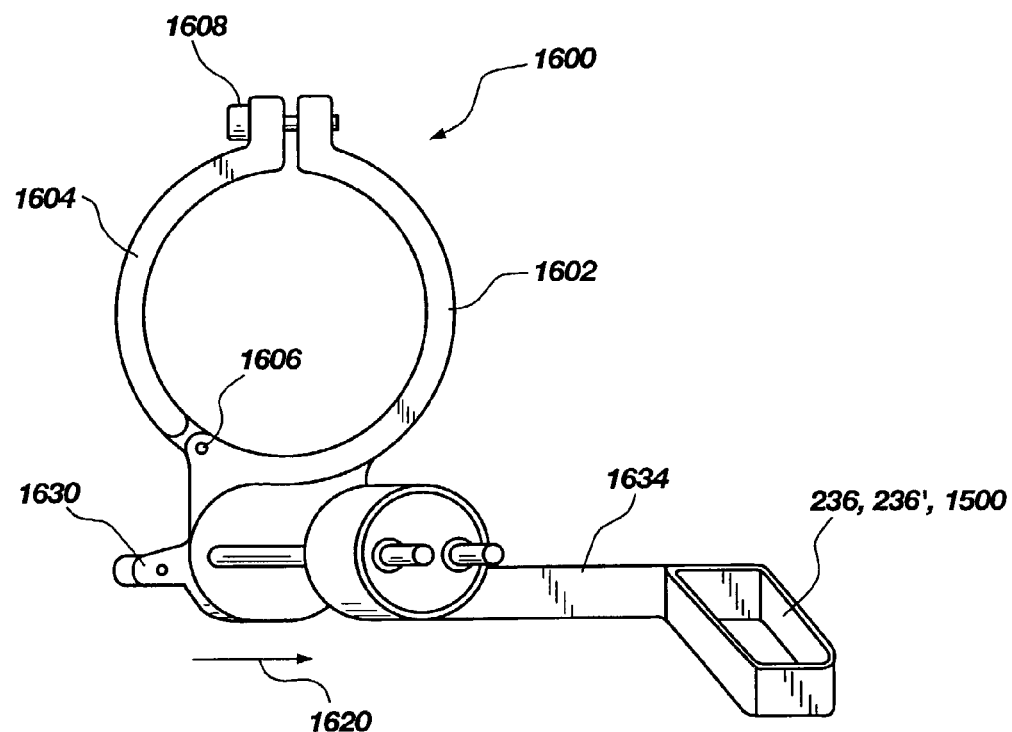
FIGS. 16A and 16B are top views of yet another embodiment of a front derailleur in accordance with the present invention.
Figure 16B:
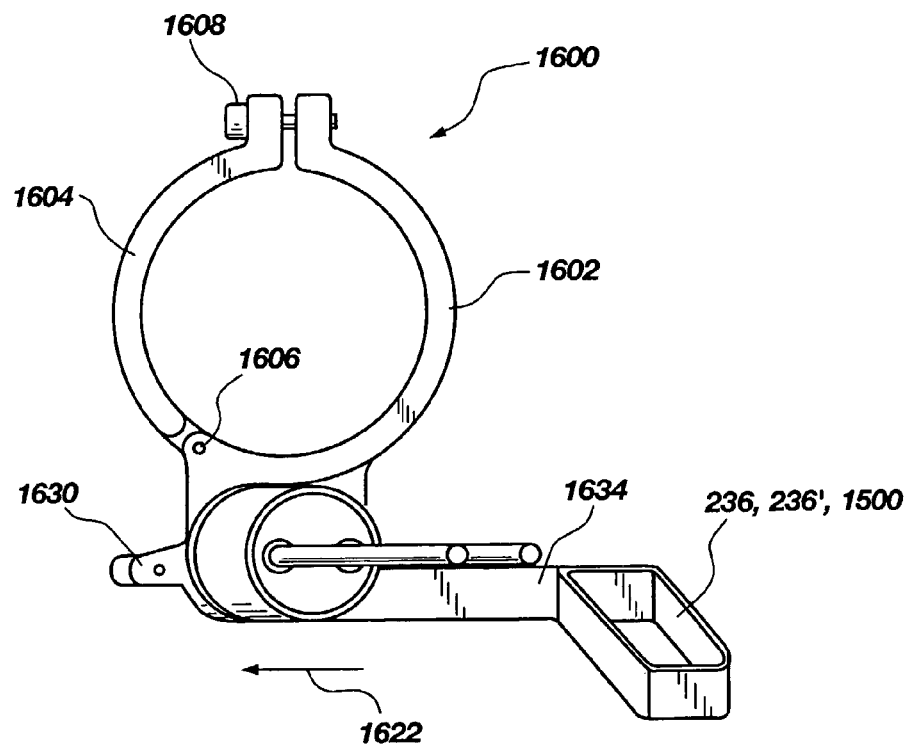

FIGS. 16A and 16B are top views of yet another embodiment of a front derailleur 1600 in accordance with the present invention. Both FIGS. 16A and 16B illustrate front derailleur 1600 from a view concentrically downward from a seat tube (or equivalent bicycle frame structural member) without pulley housing 400. Front derailleur 1600 may include guide arm 1634 with integrated annular chain guide 236, 236', 1500, bottom pull cable receiver 1630 and mounting member 1602. Mounting member may include a hinged arm 1604 rotationally coupled at one end by a hinge pivot 1606 and configured to receive a mounting screw 1608 at the opposite end. With the mounting screw 1608 removed, the hinged arm 1604 may be opened to allow placement of the mounting member 1602 around a seat tube. The mounting screw 1608, or other suitable fastener, allows the front derailleur 1600 to be secured to the seat tube in a fixed position. FIG. 16A also illustrates guide arm 1634 in a fully extended position (see arrow 1620). Similarly, FIG. 16B illustrates guide arm 1634 in a fully retracted position (see arrow 1622).

Figure 17:
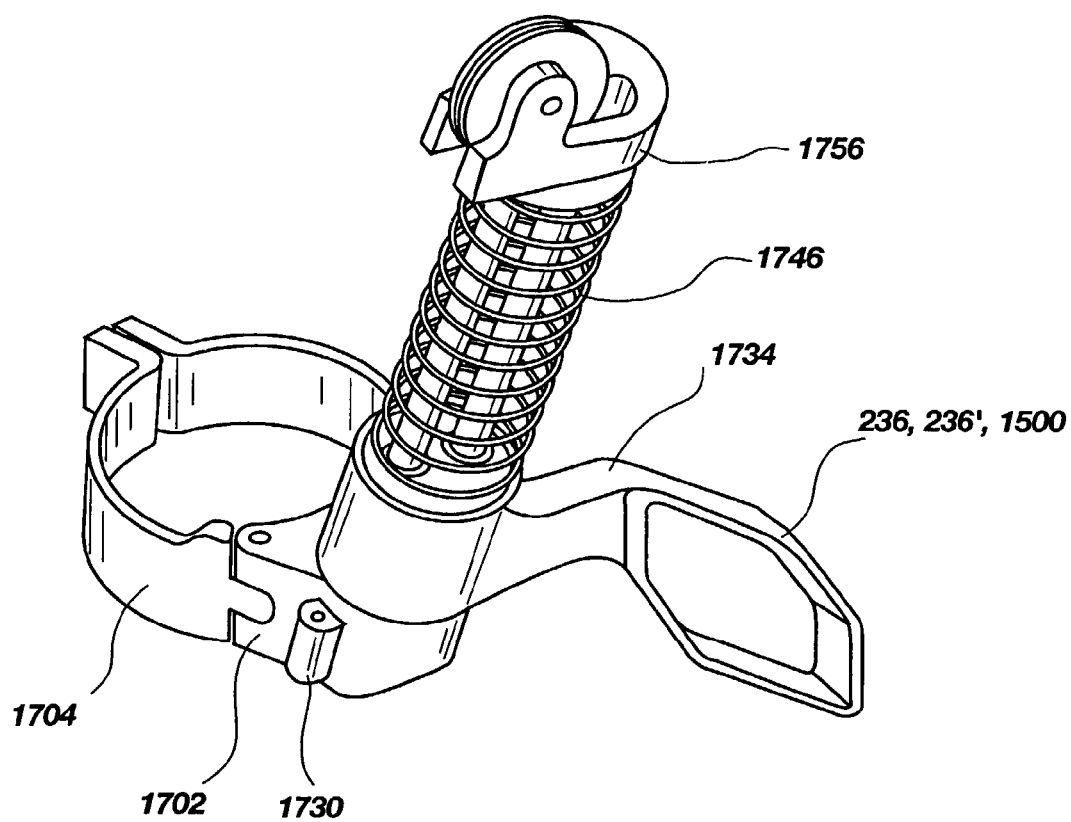
FIG. 17 is a perspective view of another embodiment of a front derailleur according to the present invention.
Figure 18:
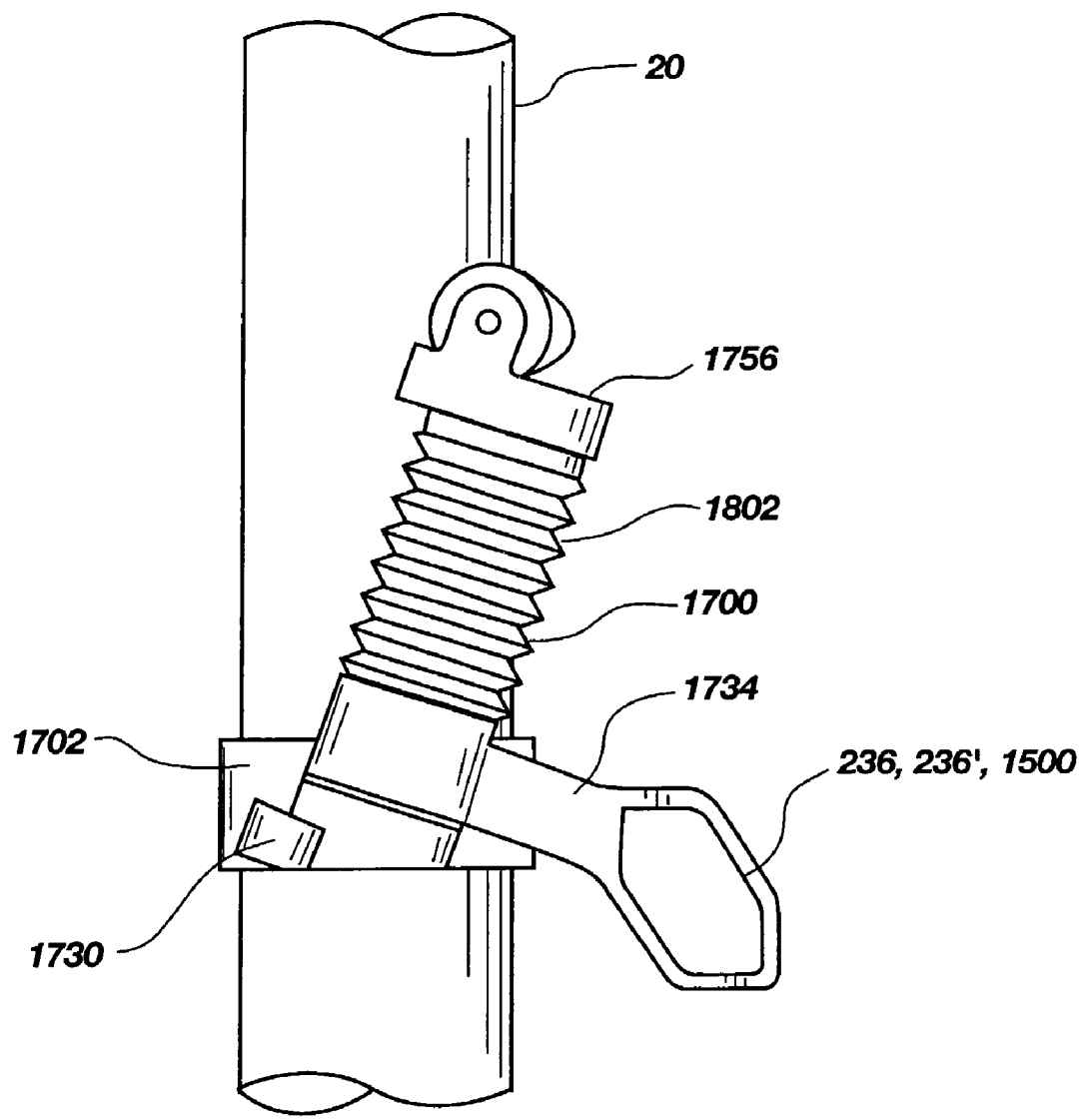
FIG. 18 is a side perspective view of the front derailleur illustrated in FIG. 17.

FIG. 17 is a perspective view of another embodiment of a front derailleur 1700 according to the present invention. Front derailleur 1700 may include guide arm 1734 with integrated annular chain guide 236, 236', 1500, pulley housing 1756, bottom pull cable receiver 1730 and mounting member 1702. Bottom pull cable receiver 1730 receives bottom pull cable 44B and optionally a cable housing. Front derailleur 1700 may also include a coil spring 1746 for biasing the guide arm 1734. FIG. 18 is a side perspective view of the front derailleur 1700 illustrated in FIG. 17, showing a boot 1802 over coil spring 1746 (not visible in FIG. 18). Boot 1802 may be formed of any suitable rubber, plastic or elastically deformable material. The purpose of boot 1802 is to protect linear guide rods 28 (not shown in FIG. 18), linear bearings 32 (not shown in FIG. 18) and coil spring 1746 (not shown in FIG. 18) from dirt, sand, water and other environmental elements. FIG. 18 also illustrates front derailleur 1700 mounted on a seat tube 20 using mounting member 1702.

Figure 19:
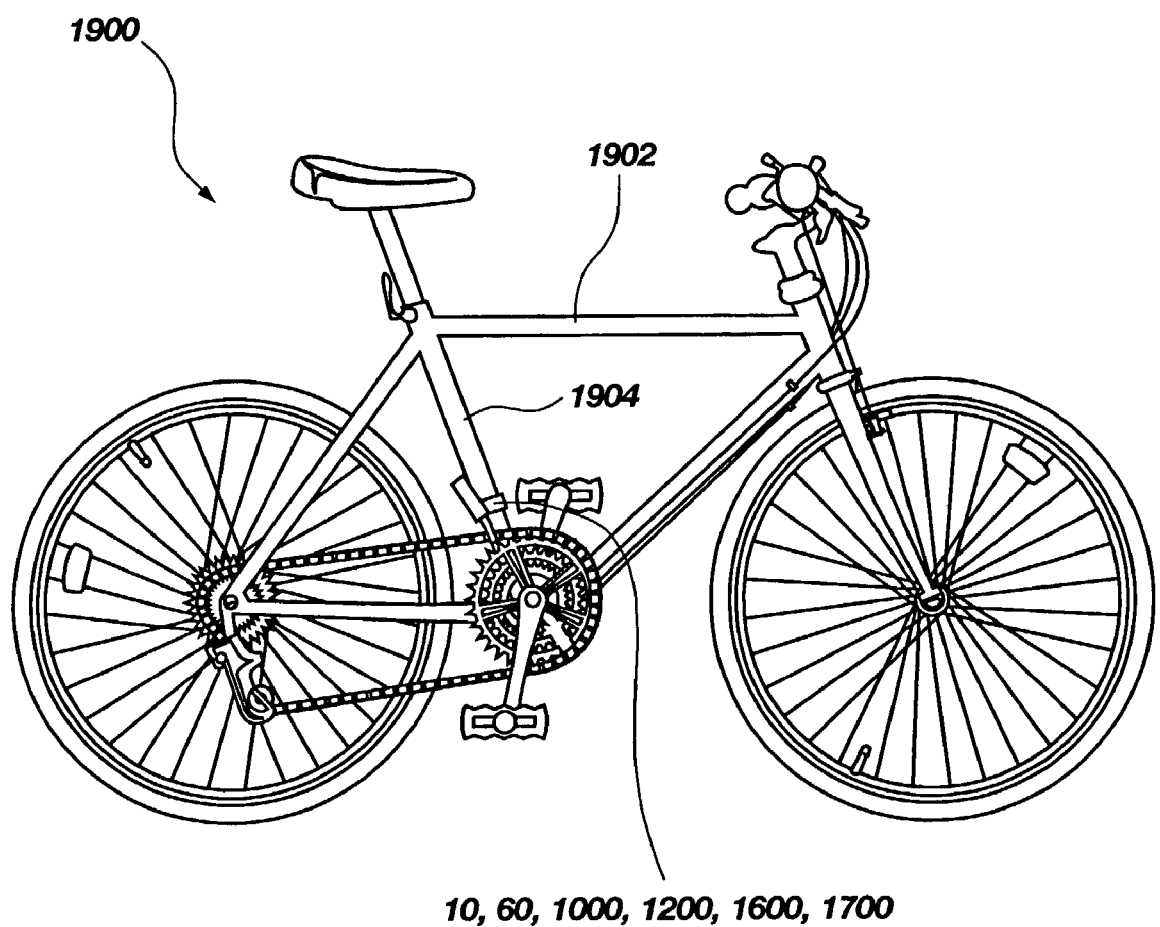
FIG. 19 is a perspective view of a bicycle with a front derailleur according to the present invention.

FIG. 19 is a perspective view of a bicycle 1900 including a bicycle frame 1902, a structural member 1904 for mounting a front derailleur and a front derailleur 10, 60, 1000, 1200, 1600, 1700, 2110 in accordance with the present invention. Structural member may be a seat tube. Bicycle 1900 may be a mountain bicycle (as shown in FIG. 19), a road bicycle, a cyclo-cross bicycle or any other bicycle requiring a front derailleur. Front derailleur 10, 60, 1000, 1200, 1600, 1700, 2110 may be used with any type of bicycle 1900 requiring a front derailleur. Additionally, front derailleur 10, 60, 1000, 1200, 1600, 1700, 2110 may be configured for use with any make or style of other bicycle components.

While various elements of the front derailleur 10, 60, 1000, 1200, 1600, 1700, 2110 have been discussed as being formed from stainless steel, other materials may be utilized in the construction of the front derailleur 10 depending on the overall intended use of the bicycle to which the front derailleur 10 will be mounted. Some of the contemplated materials would include carbon steel, aluminum, titanium, plastic, Teflon®-like materials or a composite material such as glass-impregnated plastic or resin-impregnated carbon fiber. Each of these materials has various desirable qualities and selection of material may depend on numerous factors such as corrosion protection, wear characteristics, strength-to-weight ratio, and cost to manufacture and assemble. The selection of appropriate materials is within the knowledge of one skilled in the art.

Although this invention has been described with reference to particular illustrated embodiments, the invention is not limited to the embodiments described. Rather, it should be understood that the embodiments described herein are merely exemplary and that a person skilled in the art may make many variations and modifications without departing from the spirit and scope of the invention as defined by the following claims.

What is claimed is:

1. A front derailleur for a bicycle, comprising:
a mounting member configured for attachment to a structural member of a bicycle frame;
a positioning assembly coupled with the mounting member, where a guide arm of the positioning assembly is configured for movement in a linear path; and
an annular chain guide coupled with and positionable by the guide arm of positioning assembly, wherein the annular chain guide is configured to receive a bicycle chain therethrough, wherein the annular chain guide applies force only upon corners of a cross-section of the bicycle chain during shifting.

2. The front derailleur of claim 1, wherein the positioning assembly is further configured for vertically lifting the bicycle chain during an up-shift.

3. The front derailleur of claim 1, wherein the positioning assembly is further configured for positioning the bicycle chain on a chain ring of a crankset.

4. The front derailleur of claim 1, wherein the positioning assembly and the annular chain guide are oriented and configured so that the annular chain guide receives the bicycle chain therethough at a location which is displaced laterally behind a chain ring with which the bicycle chain is engaged.

5. The front derailleur of claim 1, wherein the annular chain guide comprises:
an inner lifting surface configured for contacting a first corner of the bicycle chain when the bicycle chain is viewed in cross-section and lifting the bicycle chain at the first corner during an up-shift; and
an outer pulling surface configured for contacting a second corner of the bicycle chain and pulling the second corner down during a down-shift.

6. The front derailleur of claim 1, wherein the positioning assembly comprises two parallel linear guide rods.

7. The front derailleur of claim 1, wherein the positioning assembly includes at least one linear guide bearing.

8. The front derailleur of claim 1, further comprising a pulley housing configured to receive a cable thereabout.

9. The front derailleur of claim 8, wherein the movable positioning member is configured to be coupled to the cable.

10. The front derailleur of claim 8, wherein the pulley housing includes a cam member.

11. The front derailleur of claim 10, further comprising a transfer wire coupled between the pulley housing and the positioning assembly.

12. The front derailleur of claim 8, wherein the pulley housing is configured to receive the cable in both a top-pull and a bottom-pull configuration.

13. The front derailleur of claim 1, wherein the annular chain guide encloses an opening having a maximum area from about 0.3 to about 0.5 square inches, wherein said maximum area lies in a plane perpendicular to the direction of chain travel.

14. A front derailleur for a bicycle, comprising:
a mounting member configured for attachment to a structural member of a bicycle frame;
a positioning assembly including two linear guide rods, the position assembly coupled with the mounting member and including a movable guide arm; and
an annular chain guide coupled with and positionable by the movable guide arm of the positioning assembly, wherein the annular chain guide includes an opening for receiving a bicycle chain therethrough, and wherein a periphery of the opening is configured as a simple convex polygon having at least six sides.

15. The front derailleur of claim 14, wherein the simple convex polygon includes at least two substantially 90° internal angles.

16. The front derailleur of claim 14, wherein the simple convex polygon includes at least four obtuse internal angles.

17. The front derailleur of claim 14, wherein each of the at least six sides of the simple convex polygon exhibits a different length than any other side of the at least six sides.

18. The front derailleur of claim 14, wherein at least one of the at least six sides exhibits a length which is substantially equal to a length of at least one other side of the at least six sides.

19. The front derailleur of claim 14, wherein at least four sides of the at least six sides each exhibit a length of less than approximately 0.5 inches.

20. The front derailleur of claim 19, wherein at least two sides of the at least six sides each exhibit a length of greater than approximately 0.7 inches.

21. The front derailleur of claim 14, wherein the at least six sides includes a first side exhibiting a first length intended to be positioned above the bicycle chain, and a second side substantially parallel to and below the first side to be positioned below the bicycle chain, the second side exhibiting a second length shorter than the first length.

22. The front derailleur of claim 14, wherein at least four sides of the at least six sides are each substantially parallel to one other side of the at least six sides.

23. The front derailleur of claim 14, wherein two sides of the at least six sides are configured for contact with the bicycle chain, and wherein the two sides are configured to be substantially perpendicular to an intended angle of displacement of the bicycle chain between a first chain ring and a second chain ring of the bicycle.

24. The front derailleur of claim 14, wherein the annular chain guide exhibits a thickness taken along the direction of intended chain travel therethrough which is approximately 0.25 inches.

25. The front derailleur of claim 14, wherein the annular chain guide is configured to simultaneously contact a maximum of two chain links of the bicycle chain as it is received therethrough.

26. A front derailleur for a bicycle, comprising:
a mounting member;
a positioning assembly coupled with the mounting member and including a movable guide arm; and
an annular chain guide coupled with and positionable by the movable guide arm, wherein an opening in the annular chain guide comprises a simple convex polygon with at least five sides and the opening encloses a maximum area ranging from about 0.3 to about 0.5 square inches, wherein the maximum area is measured perpendicular to the direction of chain travel.

27. The front derailleur of claim 26, wherein the positioning assembly further includes two parallel linear guides rods coupled at one end to the mounting member and slidably coupled to the movable guide arm, wherein the two parallel linear guide rods define and constrain movement of the movable guide arm.

28. The front derailleur of claim 26, further comprising a shifter including a cable having a first end coupled to the shifter and a second end coupled to the front derailleur.

29. The front derailleur of claim 28, wherein the positioning assembly further includes a pulley housing coupled to another end of the two parallel linear guide rods, the pulley housing including a cam member configured to receive and anchor a second end of the cable and anchor a first end of a guide arm cable, a second end of the guide arm cable coupled to the movable guide arm.

30. A method for up-shifting a bicycle chain from a first chain ring of a first radius to a second chain ring of a second radius larger than the first radius while the chain rings are rotating in a direction consistent with forward bicycle motion, the method comprising:
aligning an annular chain guide around a bicycle chain on the first chain ring behind the first chain ring; and
causing the annular chain guide to lift up only on an inside lower corner of the bicycle chain from behind the first chain ring to behind the second chain ring.

31. The method according to claim 30, further comprising configuring an opening of the annular chain guide as a simple convex polygon having at least five sides.

32. The method according to claim 31, wherein the simple convex polygon comprises six sides.

33. The method according to claim 31, wherein the opening encloses a maximum area from about 0.3 to about 0.5 square inches, wherein said maximum area lies in a plane perpendicular to the direction of chain travel.

34. The method according to claim 30, wherein the lift up comprises linear movement.

35. A method for down-shifting a bicycle chain from a first chain ring of a first radius to a second chain ring of a second radius smaller than the first radius while the chain rings are rotating in a direction consistent with forward bicycle motion, the method comprising:
aligning an annular chain guide around a bicycle chain on the first chain ring behind the first chain ring; and
causing the annular chain guide to pull down only on an outside upper corner of the bicycle chain from behind the first chain ring to behind the second chain ring.

36. The method according to claim 35, further comprising configuring an opening of the annular chain guide as a simple convex polygon having at least five sides.

37. The method according to claim 36, wherein the simple convex polygon comprises six sides.

38. The method according to claim 36, wherein the opening encloses a maximum area from about 0.3 to about 0.5 square inches, wherein said maximum area is measured perpendicular to the direction of chain travel.

39. The method according to claim 35, wherein the pull down comprises linear movement.

* * * * *